United States Patent
Ogino et al.

(10) Patent No.: US 9,128,267 B2
(45) Date of Patent: Sep. 8, 2015

(54) IMAGING LENS AND IMAGING APPARATUS INCLUDING THE IMAGING LENS

(71) Applicant: FUJIFILM Corporation, Tokyo (JP)

(72) Inventors: Tatsuyuki Ogino, Saitama-ken (JP); Michio Cho, Saitama-ken (JP); Yoshiaki Ishii, Saitama-ken (JP)

(73) Assignee: FUJIFILM CORPORATON, Tokyo (JP)

( * ) Notice: Subject to any disclaimer, the term of this patent is extended or adjusted under 35 U.S.C. 154(b) by 0 days.

(21) Appl. No.: 14/226,172

(22) Filed: Mar. 26, 2014

(65) Prior Publication Data

US 2014/0293453 A1 Oct. 2, 2014

(30) Foreign Application Priority Data

Mar. 29, 2013 (JP) .................. 2013-072282

(51) Int. Cl.
*G02B 3/02* (2006.01)
*G02B 13/00* (2006.01)

(52) U.S. Cl.
CPC .................. *G02B 13/0045* (2013.01)

(58) Field of Classification Search
CPC .................................... G02B 13/0045
USPC ............................................ 359/714
See application file for complete search history.

(56) References Cited

U.S. PATENT DOCUMENTS

| | | | |
|---|---|---|---|
| 8,310,768 B2 | 11/2012 | Lin et al. | |
| 2010/0253829 A1* | 10/2010 | Shinohara | 348/340 |
| 2012/0087020 A1* | 4/2012 | Tang et al. | 359/714 |
| 2013/0033765 A1 | 2/2013 | Tsai et al. | |

* cited by examiner

*Primary Examiner* — James Jones
(74) *Attorney, Agent, or Firm* — Young & Thompson

(57) ABSTRACT

An imaging lens substantially consists of, in order from an object side, five lenses of a first lens that has a positive refractive power and has a meniscus shape which is convex toward the object side, a second lens that has a biconcave shape, a third lens that has a meniscus shape which is convex toward the object side, a fourth lens that has a meniscus shape which is convex toward the image side; and a fifth lens that has a negative refractive power and has at least one inflection point on an image side surface. Further, the following conditional expression (1) is satisfied.

$$1.4 < f/f1 < 4 \qquad (1)$$

21 Claims, 14 Drawing Sheets

EXAMPLE 1

FIG.3  EXAMPLE 3

FIG.4  EXAMPLE 4

FIG.5  EXAMPLE 5

FIG.6  EXAMPLE 6

IMAGING LENS AND IMAGING APPARATUS INCLUDING THE IMAGING LENS

BACKGROUND OF THE INVENTION

1. Field of the Invention

The present invention relates to a fixed-focus imaging lens that forms an optical image of a subject on an imaging device, such as a charge coupled device (CCD) and a complementary metal oxide semiconductor (CMOS), and to an imaging apparatus, such as a digital still camera, a cellular phone with a camera, a mobile information terminal (PDA: Personal Digital Assistance), a smartphone, a tablet terminal, and a mobile game machine, on which the imaging lens is mounted to perform photography.

2. Description of the Related Art

As personal computers have become popular in homes, digital still cameras which are capable of inputting image information about photographed scenes, persons, and the like into the personal computers have spread rapidly. Further, a cellular phone, a smartphone, or a tablet terminal in which a camera module for inputting images is installed has been increasing. Such apparatus having an imaging function uses an imaging device, such as a CCD and a CMOS. Recently, because the imaging device has been miniaturized, there has been also a demand to miniaturize the whole of the imaging apparatus and an imaging lens mounted thereon. Further, since the number of pixels included in the imaging device has also been increasing, there has been a demand to enhance the resolution and performance of the imaging lens. For example, there has been a demand for performance corresponding to high resolution of 5 megapixels or higher, and preferably performance corresponding to high resolution of 8 megapixels or higher.

To satisfy such demands, it can be considered that the imaging lens is composed of five or six lenses, which are a relatively large number of lenses. For example, U.S. Pat. No. 8,310,768 (Patent Document 1) and U.S. Patent Application Publication No. 20130033765 (Patent Document 2) propose an imaging lens composed of five lenses. The imaging lens disclosed in Patent Documents 1 and 2 substantially consists of, in order from an object side, five lenses of a first lens that has a positive refractive power, a second lens that has a negative refractive power, a third lens that has a positive refractive power, a fourth lens that has a positive refractive power, and a fifth lens that has a negative refractive power.

SUMMARY OF THE INVENTION

In particular, for the imaging lenses used in apparatuses, of which the thickness has been decreased, such as a cellular phone, a smartphone or a tablet terminal, a demand to decrease the total length of the lens has been increased more and more. Hence, it is necessary to further decrease the total lengths of the imaging lenses disclosed in Patent Documents 1 and 2.

The present invention has been made in view of the above-mentioned circumstances and an object thereof is to provide an imaging lens capable of achieving high imaging performance in the range from the central angle of view to the peripheral angle of view while achieving a decrease in the total length thereof. Another object of the present invention is to provide an imaging apparatus capable of obtaining a photographed image with high resolution through the imaging lens which is mounted thereon.

The imaging lens of the present invention is an imaging lens substantially consisting of, in order from an object side, five lenses of:

a first lens that has a positive refractive power and has a meniscus shape which is convex toward the object side;

a second lens that has a biconcave shape;

a third lens that has a meniscus shape which is convex toward the object side;

a fourth lens that has a meniscus shape which is convex toward an image side; and a fifth lens that has a negative refractive power and has at least one inflection point on an image side surface, in which the following conditional expression (1) is satisfied:

$$1.4 < f/f1 < 4 \qquad (1),$$

where f is a focal length of a whole system, and
f1 is a focal length of the first lens.

According to the imaging lens of the present invention, in the imaging lens which is composed of five lenses as a whole, a configuration of each lens element of the first to fifth lenses is optimized. Therefore, it is possible to achieve a lens system that has high resolution performance while decreasing the total length thereof.

In the imaging lens of the present invention, the expression "substantially consisting of five lenses" means that the imaging lens of the present invention may include not only the five lenses but also a lens which has substantially no refractive power, optical elements, such as a stop and a cover glass, which are not a lens, mechanism parts, such as a lens flange, a lens barrel, an imaging device and a hand shake blur correction mechanism, and the like. When the lens includes an aspheric surface, the reference sign of the surface shape and refractive power of the lens is considered in a paraxial region.

In the imaging lens of the present invention, by employing and satisfying the following desirable configuration, it is possible to make the optical performance thereof better.

In the imaging lens of the present invention, it is desirable that the fourth lens have a positive refractive power.

It is desirable that the imaging lens of the present invention further include an aperture stop that is disposed on the object side of an object side surface of the second lens.

It is desirable that the imaging lens of the present invention satisfy any of the following conditional expressions (1-1) to (10). It should be noted that, as a desirable mode, any one of the conditional expressions (1-1) to (10) may be satisfied, or an arbitrary combination thereof may be satisfied. However, regarding the conditional expression (7-1), when the composite refractive power of the first to third lenses is positive, it is desirable to satisfy the conditional expression (7-1).

$$1.5 < f/f1 < 3.5 \qquad (1\text{-}1),$$

$$-3 < f/f2 < -0.85 \qquad (2),$$

$$-2.5 < f/f2 < -0.9 \qquad (2\text{-}1),$$

$$0.78 < f/f12 < 2.5 \qquad (3),$$

$$0.8 < f/f12 < 2 \qquad (3\text{-}1),$$

$$-2 < f/f345 < 0 \qquad (4),$$

$$-1.5 < f/f345 < -0.05 \qquad (4\text{-}1),$$

$$-0.5 < f1/f3 < 0.4 \qquad (5),$$

$$-0.4 < f1/f3 < 0.2 \qquad (5\text{-}1),$$

$$-1 < (R3f - R3r)/(R3f + R3r) < 1.2 \quad (6),$$

$$-0.6 < (R3f - R3r)/(R3f + R3r) < 1 \quad (6\text{-}1),$$

$$-4 < f/f5 < -0.2 \quad (7),$$

$$-3 < f/f5 < -0.4 \quad (7\text{-}1),$$

$$0.5 < f \cdot \tan \omega / R5r < 10 \quad (8),$$

$$0.7 < f \cdot \tan \omega / R5r < 3 \quad (8\text{-}1),$$

$$-0.9 < f/f3 < 0.7 \quad (9), \text{ and}$$

$$0.05 < D7/f < 0.2 \quad (10), \text{ where}$$

f is a focal length of a whole system,
f1 is a focal length of the first lens,
f2 is a focal length of the second lens,
f3 is a focal length of the third lens,
f5 is a focal length of the fifth lens,
f12 is a composite focal length of the first lens and the second lens,
f345 is a composite focal length of the third to fifth lenses,
R3f is a paraxial radius of curvature of an object side surface of the third lens,
R3r is a paraxial radius of curvature of an image side surface of the third lens,
R5r is a paraxial radius of curvature of an image side surface of the fifth lens,
D7 is a spacing on an optical axis between the third lens and the fourth lens, and
ω is a half angle of view.

The imaging apparatus of the present invention includes the imaging lens of the present invention.

In the imaging apparatus of the present invention, imaging signals with high resolution can be obtained based on an optical image with high resolution obtained by the imaging lens of the present invention.

According to the imaging lens of the present invention, in the imaging lens which is composed of five lenses as a whole, a configuration of each lens element is optimized, and particularly the shapes of the first and fifth lenses are appropriately formed. Therefore, it is possible to achieve a lens system that has high resolution performance in the range from the central angle of view to the peripheral angle of view while decreasing the total length thereof.

Further, according to the imaging apparatus of the present invention, imaging signals based on an optical image formed by the imaging lens of the present invention, which has high imaging performance, are output. Therefore, it is possible to obtain a photographed image with high resolution.

DESCRIPTION OF THE PREFERRED EMBODIMENTS

Hereinafter, embodiments of the present invention will be described in detail with reference to the accompanying drawings.

Figure 1:
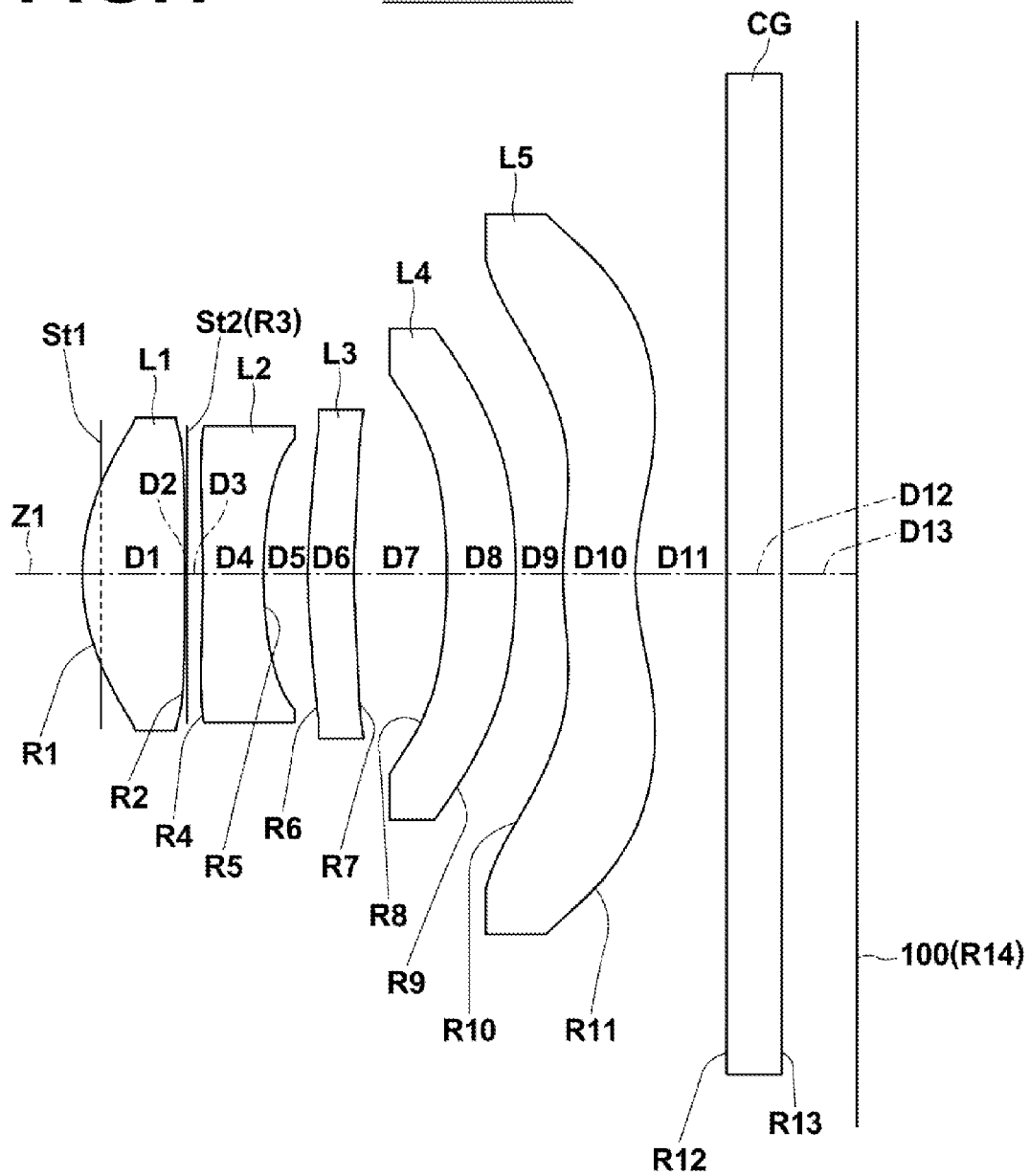
FIG. 1 is a lens cross-sectional view illustrating a first configuration example of an imaging lens according to an embodiment of the present invention and corresponding to Example 1.

FIG. 1 shows a first configuration example of an imaging lens according to a first embodiment of the present invention. The configuration example corresponds to a lens configuration of a first numerical value example (Table 1 and Table 2)

to be described later. Likewise, FIGS. 2 to 6 show cross sections of second to sixth configuration examples corresponding to the imaging lenses according to second to sixth embodiments to be described later. The second to sixth configuration examples correspond to lens configurations of the second to sixth numerical value examples (Tables 3 to 12) to be described later. In FIGS. 1 to 6, the reference sign Ri represents a radius of curvature of i-th surface, where the number i is the sequential number that sequentially increases as it gets closer to an image side (an imaging side) when a surface of a lens element closest to an object side is regarded as a first surface. The reference sign Di represents an on-axis surface spacing between i-th surface and (i+1) th surface on an optical axis Z1. Since the respective configuration examples are basically similar in configuration, the following description will be given on the basis of the first configuration example of the imaging lens shown in FIG. 1, and the configuration examples shown in FIGS. 2 to 6 will be also described as necessary. Further, FIG. 7 is an optical path diagram of the imaging lens L shown in FIG. 1, and shows an optical path of rays 2 on the optical axis from an object point at the infinite distance and an optical path of rays 3 at the maximum angle of view.

An imaging lens L according to an embodiment of the present invention is appropriate to be used in various kinds of imaging apparatuses using imaging devices such as a CCD and a CMOS. Especially, the imaging lens L is appropriate to be used in relatively small-sized mobile terminal apparatus, for example, such as a digital still camera, a cellular phone with a camera, a smartphone, a tablet terminal, and a PDA. This imaging lens L includes, along the optical axis Z1, a first lens L1, a second lens L2, a third lens L3, a fourth lens L4, and a fifth lens L5 in this order from the object side.

Figure 14:
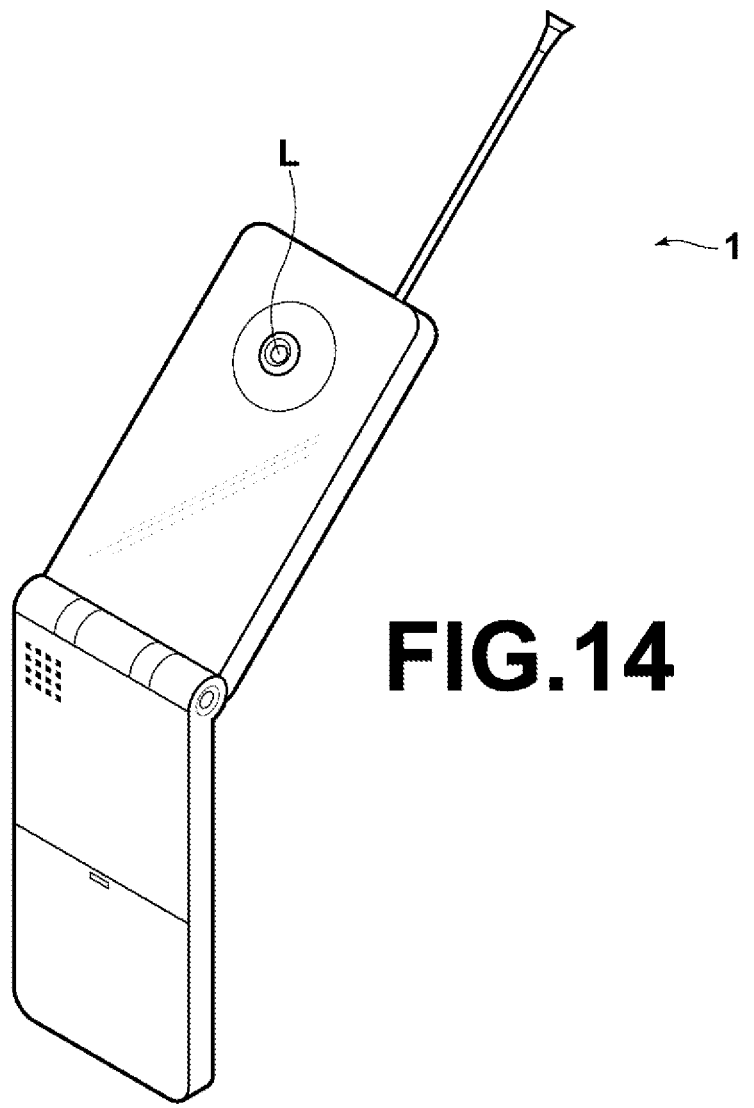
FIG. 14 is a diagram illustrating an imaging apparatus which is a cellular phone terminal including the imaging lens according to the present invention.

FIG. 14 is a schematic diagram illustrating a cellular phone terminal, which is an imaging apparatus 1 according to an embodiment of the present invention. The imaging apparatus 1 according to the embodiment of the present invention includes imaging lens L according to the present embodiment and an imaging device 100 (refer to FIG. 1), such as a CCD, which outputs imaging signals based on an optical image formed by the imaging lens L. The imaging device 100 is disposed at an image formation surface (image plane R14) of the imaging lens L.

Figure 15:
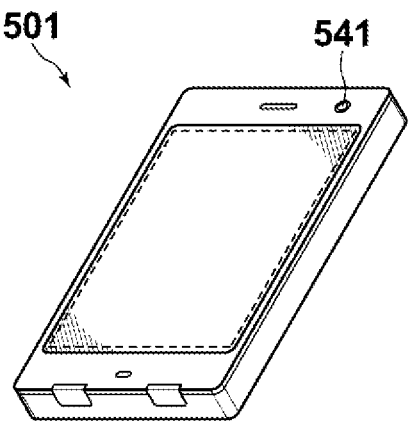
FIG. 15 is a diagram illustrating an imaging apparatus which is a smartphone including the imaging lens according to the present invention.

FIG. 15 is a schematic diagram illustrating a smartphone which is an imaging apparatus 501 according to an embodiment of the present invention. The imaging apparatus 501 according to the embodiment of the present invention includes a camera unit 541 including the imaging lens L according to the present embodiment and the imaging device 100 (refer to FIG. 1), such as a CCD, which outputs imaging signals based on an optical image formed by the imaging lens L. The imaging device 100 is disposed at the image formation surface (image plane R14) of the imaging lens L.

Various optical members CG may be disposed between the fifth lens L5 and the imaging device 100 based on the configuration of a camera on which the imaging lens is mounted. For example, a flat-plate-shaped optical member, such as a cover glass for protecting an imaging surface and an infrared-ray cut filter, may be disposed. In this case, for example, a flat-plate-shaped cover glass to which a coating having an effect of a filter, such as an infrared-ray cut filter and an ND filter, has been applied, or a material having the same effect may be used as the optical member CG.

Alternatively, an effect similar to the optical member CG may be given to the fifth lens L5 or the like by applying a coating to the fifth lens L5 or the like without using the optical member CG. Thereby, it is possible to reduce the number of components, and to reduce the total length.

Further, it is desirable that the imaging lens L includes an aperture stop St disposed on the object side of an object side surface of the second lens L2. Since the aperture stop St is disposed on the object side of the object side surface of the second lens L2 in such a manner, especially in a peripheral portion of an imaging area, it is possible to prevent an angle of incidence of rays, which pass through the optical system and are incident onto an imaging surface (imaging device), from becoming large. In order to further enhance this effect, it is more desirable that the aperture stop St be disposed on the object side of an object side surface of the first lens L1. Here, the expression "disposed on the object side of the object side surface of the second lens L2" means that the position of the aperture stop in the optical axis direction is the same as an intersection point between an on-axis marginal ray and the object side surface of the second lens L2 or located on the object side of the intersection point. Likewise, the expression "disposed on the object side of an object side surface of the first lens L1" means that the position of the aperture stop in the optical axis direction is the same as an intersection point between an on-axis marginal ray and the object side surface of the first lens L1 or located on the object side of the intersection point.

In the embodiments of the present invention, the imaging lenses of the third and sixth configuration examples (refer to FIGS. 3 and 6) are configuration examples in which the aperture stop St is disposed on the object side of the object side surface of the first lens L1, and the imaging lenses of the first, second, fourth and fifth configuration examples (refer to FIGS. 1, 2, 4 and 5) are configuration examples in which the aperture stop St is disposed on the object side of the object side surface of the second lens L2. It should be noted that the aperture stop St shown herein does not necessarily represent the size or shape thereof but shows the position thereof on the optical axis Z1.

When the aperture stop St is disposed on the object side of the object side surface of the second lens L2, a flare stop for suppressing a flare component or a ghost component may be further provided on the object side of the object side surface of the first lens L1. In the embodiments of the present invention, lenses as first and second configuration examples (FIGS. 1 and 2) are configuration examples in which the flare stop is provided. It should be noted that, in FIGS. 1 and 2, the flare stop is referenced by the reference sign St1, and the aperture stop is referenced by the reference sign St2. In this case, the aperture stop St2 is a stop that restricts an F-number, and the flare stop St1 is a stop that restricts rays at peripheral angles of view.

Furthermore, when the aperture stop St is disposed on the object side of the object side surface of the first lens L1 in the optical axis, it is desirable that the aperture stop St be disposed on the image side of a vertex of the surface of the first lens L1. When the aperture stop St is disposed on the image side of the vertex of the surface of the first lens L1 in such a manner, it is possible to reduce the total length of the imaging lens including the aperture stop St. In the above-mentioned embodiments, the aperture stop St is disposed on the image side of the vertex of the surface of the first lens L1. However, the invention is not limited to the embodiments, and the aperture stop St may be disposed on the object side of the vertex of the surface of the first lens L1. The arrangement, in which the aperture stop St is disposed on the object side of the vertex of the surface of the first lens L1, is slightly disadvantageous in terms of securing a peripheral light amount, compared with a case where the aperture stop St is disposed on the image side of the vertex of the surface of the first lens L1. However, the arrangement can prevent an angle of incidence of rays, which pass through the optical system and are incident onto the imaging surface (imaging device), from becoming large in the peripheral portion of the imaging area in a more desirable manner.

As in the imaging lenses according to the first, second, fourth and fifth embodiments shown in FIGS. 1, 2, 4 and 5, the aperture stop St (St2) may be disposed between the first lens L1 and the second lens L2 in the optical axis direction. In this case, it is possible to satisfactorily correct a curvature of field. When the aperture stop St is disposed between the first lens L1 and the second lens L2 in the optical axis direction, as compared with a case where the aperture stop St is disposed on the object side of the object side surface of the first lens L1 in the optical axis direction, this arrangement is disadvantageous in securing telecentricity, that is, making the principal rays parallel to such an extent that the principal rays are regarded as the optical axis (setting an incident angle thereof on the imaging surface such that the angle is approximate to zero). Thus, by applying an imaging device which is recently implemented as the development in the imaging device technology advances and in which deterioration in the light receiving efficiency and occurrence of color mixture due to increase of incident angle are more reduced than in the conventional imaging device, it is possible to achieve optimum optical performance.

In the imaging lens L, the first lens L1 has a positive refractive power in the vicinity of the optical axis, and has a meniscus shape which is convex toward the object side in the vicinity of the optical axis. As shown in the embodiments, by making the first lens L1, which is a lens closest to the object, have a positive refractive power and have a meniscus shape which is convex toward the object side in the vicinity of the optical axis, the position of the rear side principal point of the first lens L1 can be set to be close to the object, and thus it is possible to appropriately reduce the total length.

The second lens L2 has a biconcave shape in the vicinity of the optical axis. Thereby, it is possible to appropriately suppress occurrence of a high-order spherical aberration while satisfactorily correcting a chromatic aberration, and it is also possible to appropriately reduce the total length.

The third lens L3 has a meniscus shape which is convex toward the object side in the vicinity of the optical axis. Thereby, the position of the rear side principal point of the third lens L3 can be more appropriately set to be close to the object side, and thus it is possible to appropriately reduce the total length. As long as the third lens L3 has a meniscus shape which is convex toward the object side in the vicinity of the optical axis, it is possible to adopt a configuration in which the third lens L3 has a positive refractive power in the vicinity of the optical axis, and it is also possible to adopt a configuration in which the third lens L3 has a negative refractive power in the vicinity of the optical axis. As in the imaging lenses according to the first to third embodiments shown in FIGS. 1 to 3, when the third lens L3 is configured to have a positive refractive power in the vicinity of the optical axis, it is possible to more appropriately reduce the total length. Further, as in the imaging lenses according to the fourth to sixth embodiments shown in FIGS. 4 to 6, when the third lens L3 is configured to have a negative refractive power in the vicinity of the optical axis, it is possible to more satisfactorily correct a chromatic aberration.

The fourth lens L4 has a meniscus shape which is convex toward the image side in the vicinity of the optical axis. Thereby, it is possible to appropriately correct astigmatism. It is desirable that the fourth lens L4 have a positive refractive power in the vicinity of the optical axis. Thereby, especially at the medium angle of view, it is possible to prevent the angle of incidence of rays, which pass through the optical system and are incident onto the image formation surface (imaging device), from becoming large, and thus it is possible to satisfactorily correct a lateral chromatic aberration while appropriately reducing the total length.

The fifth lens L5 has a negative refractive power in the vicinity of the optical axis. A lens, which has a negative refractive power in the vicinity of the optical axis, is disposed to be closest to the image side of the imaging lens, whereby the imaging lens can be more appropriately made to have a telephoto type configuration as a whole, and thus it is possible to appropriately reduce the total length. In addition, since the fifth lens L5 has a negative refractive power in the vicinity of the optical axis, it is possible to appropriately correct a curvature of field. When the fifth lens L5 is concave toward the image side in the vicinity of the optical axis, it is possible to satisfactorily correct a curvature of field while more appropriately reducing the total length. In order to further enhance this effect, as shown in the first, second, and sixth embodiments, it is desirable that the fifth lens L5 have a meniscus shape which is concave toward the image side in the vicinity of the optical axis.

The fifth lens L5 has at least one inflection point within an effective diameter of the image side surface. The "inflection point" on the image side surface of the fifth lens L5 is defined as a point at which the shape of the image side surface of the fifth lens L5 changes from a convex shape to a concave shape (or from a concave shape to a convex shape) toward the image side. The inflection point can be disposed at an arbitrary position on the outside in a radial direction from the optical axis as long as the point is within the effective diameter of the image side surface of the fifth lens L5. As shown in the respective embodiments, by forming the image side surface of the fifth lens L5 in a shape in which the image side surface has at least one inflection point, especially in a peripheral portion of an image formation area, it is possible to prevent the angle of incidence of rays, which pass through the optical system and are incident onto the image formation surface (imaging device), from becoming large.

According to the imaging lens L, in the imaging lens which is composed of five lenses as a whole, a configuration of each lens element of the first to fifth lenses L1 to L5 is optimized. Therefore, it is possible to achieve a lens system that has high resolution performance while decreasing the total length thereof.

In the imaging lens L, in order to enhance the performance thereof, it is desirable that at least one surface of each lens of the first to fifth lenses L1 to L5 be formed as an aspheric surface.

Further, it is desirable that each of the lenses L1 to L5 constituting the imaging lens L be not formed as a cemented lens but a single lens. The reason is that, compared with a case where any of the lenses L1 to L5 is formed as a cemented lens, since the number of aspheric surfaces increases, a degree of freedom in design of each lens is enhanced, and it is possible to appropriately achieve reduction in the total length thereof.

Next, effects and advantages of the conditional expressions of the imaging lens L configured as described above will be described in detail.

First, it is desirable that the focal length f1 of the first lens L1 and the focal length f of the whole system satisfy the following conditional expression (1).

$$1.4 < f/f1 < 4 \qquad (1)$$

The conditional expression (1) defines a desirable numerical range of a ratio of the focal length f of the whole system to the focal length f1 of the first lens L1. By securing the refractive power of the first lens L1 such that f/f1 is greater than the lower limit of the conditional expression (1), the positive refractive power of the first lens L1 does not become excessively weak relative to the refractive power of the whole system, and thus it is possible to appropriately reduce the total length. By maintaining the refractive power of the first lens L1 such that f/f1 is less than the upper limit of the conditional expression (1), the positive refractive power of the first lens L1 does not become excessively strong relative to the refractive power of the whole system, and thus it is possible to satisfactorily correct especially a spherical aberration. In order to further enhance this effect, it is more desirable to satisfy the conditional expression (1-1), and it is even more desirable to satisfy the conditional expression (1-2).

$$1.5 < f/f1 < 3.5 \tag{1-1}$$

$$1.6 < f/f1 < 3 \tag{1-2}$$

Further, it is desirable that the focal length f2 of the second lens L2 and the focal length f of the whole system satisfy the following conditional expression (2).

$$-3 < f/f2 < -0.85 \tag{2}$$

The conditional expression (2) defines a desirable numerical range of a ratio of the focal length f of the whole system to the focal length f2 of the second lens L2. By maintaining the refractive power of the second lens L2 such that f/f2 is greater than the lower limit of the conditional expression (2), the refractive power of the second lens L2 does not become excessively strong relative to the refractive power of the whole system, and thus it is possible to appropriately reduce the total length. By securing the refractive power of the second lens L2 such that f/f2 is less than the upper limit of the conditional expression (2), the refractive power of the second lens L2 does not become excessively weak relative to the refractive power of the whole system, and thus it is possible to satisfactorily correct especially a longitudinal chromatic aberration. In order to further enhance this effect, it is more desirable to satisfy the conditional expression (2-1), and it is even more desirable to satisfy the conditional expression (2-2).

$$-2.5 < f/f2 < -0.9 \tag{2-1}$$

$$-2 < f/f2 < -0.95 \tag{2-2}$$

It is desirable that a composite focal length f12 of the first lens L1 and the second lens L2 and the focal length f of the whole system satisfy the following conditional expression (3).

$$0.78 < f/f12 < 2.5 \tag{3}$$

The conditional expression (3) defines a desirable numerical range of a ratio of the focal length f of the whole system to the composite focal length f12 of the first lens L1 and the second lens L2. By securing the composite refractive power of the first lens L1 and the second lens L2 such that f/f12 is greater than the lower limit of the conditional expression (3), the composite refractive power of the first lens L1 and the second lens L2 does not become excessively weak relative to the refractive power of the whole system, and thus it is possible to appropriately reduce the total length. By maintaining the composite refractive power of the first lens L1 and the second lens L2 such that f/f12 is less than the upper limit of the conditional expression (3), the composite refractive power of the first lens L1 and the second lens L2 does not become excessively strong relative to the refractive power of the whole system, and thus it is possible to satisfactorily correct particularly a spherical aberration and a longitudinal chromatic aberration. In order to further enhance this effect, it is desirable to satisfy the conditional expression (3-1), and it is more desirable to satisfy the conditional expression (3-2).

$$0.8 < f/f12 < 2 \tag{3-1}$$

$$0.9 < f/f12 < 1.8 \tag{3-2}$$

Further, it is desirable that the composite focal length f345 of the third to fifth lenses L3 to L5 and the focal length f of the whole system satisfy the following conditional expression (4).

$$-2 < f/f345 < 0 \tag{4}$$

The conditional expression (4) defines a desirable numerical range of a ratio of the focal length f of the whole system to the composite focal length f345 of the third to fifth lenses L3 to L5. By maintaining the composite refractive power of the third to fifth lenses L3 to L5 such that f/f345 is greater than the lower limit of the conditional expression (4), the composite refractive power of the third to fifth lenses L3 to L5 does not become excessively strong relative to the refractive power of the whole system, and thus, especially at the medium angle of view, it is possible to prevent the angle of incidence of rays, which pass through the optical system and are incident onto the image formation surface (imaging device), from becoming large. By securing the composite refractive power of the third to fifth lenses L3 to L5 such that f/f345 is less than the upper limit of the conditional expression (4), the composite refractive power of the third to fifth lenses L3 to L5 does not become excessively weak relative to the refractive power of the whole system, and thus it is possible to appropriately reduce the total length. In order to further enhance this effect, it is desirable to satisfy the conditional expression (4-1), and it is more desirable to satisfy the conditional expression (4-2).

$$-1.5 < f/f345 < -0.05 \tag{4-1}$$

$$-1.2 < f/f345 < -0.05 \tag{4-2}$$

Further, it is desirable that the focal length f1 of the first lens L1 and the focal length f3 of the third lens L3 satisfy the following conditional expression (5).

$$-0.5 < f1/f3 < 0.4 \tag{5}$$

The conditional expression (5) defines a desirable numerical range of a ratio of the focal length f1 of the first lens L1 to the focal length f3 of the third lens L3. When the third lens L3 has a negative refractive power, by securing the refractive power of the third lens L3 relative to the refractive power of the first lens L1 such that f1/f3 is greater than the lower limit of the conditional expression (5), the negative refractive power of the third lens L3 does not become excessively strong relative to the refractive power of the first lens L1. As a result, it is possible to appropriately reduce the total length. When the third lens L3 has a positive refractive power, by securing the refractive power of the third lens L3 relative to the refractive power of the first lens L1 such that f1/f3 is less than the upper limit of the conditional expression (5), the positive refractive power of the third lens L3 does not become excessively strong relative to the refractive power of the first lens L1. As a result, it is possible to satisfactorily correct a spherical aberration. In order to further enhance this effect, it is more desirable to satisfy the conditional expression (5-1).

$$-0.4 < f1/f3 < 0.2 \tag{5-1}$$

It is desirable that the paraxial radius of curvature R3f of the object side surface of the third lens L3 and the paraxial radius of curvature R3r of the image side surface of the third lens L3 satisfy the following conditional expression (6).

$$-1<(R3f-R3r)/(R3f+R3r)<1.2 \qquad (6)$$

The conditional expression (6) defines each of a desirable numerical range of the paraxial radius of curvature R3f of the object side surface of the third lens L3 and a desirable numerical range of the paraxial radius of curvature R3r of the image side surface of the third lens L3. By setting the paraxial radius of curvature R3f of the object side surface of the third lens L3 and the paraxial radius of curvature R3r of the image side surface of the third lens L3 such that (R3f−R3r)/(R3f+R3r) is greater than the lower limit of the conditional expression (6), it is possible to appropriately reduce the total length. By setting the paraxial radius of curvature R3f of the object side surface of the third lens L3 and the paraxial radius of curvature R3r of the image side surface of the third lens L3 such that (R3f−R3r)/(R3f+R3r) is less than the upper limit of the conditional expression (6), it is possible to satisfactorily correct a spherical aberration. In order to further enhance this effect, it is more desirable to satisfy the following conditional expression (6-1).

$$-0.6<(R3f-R3r)/(R3f+R3r)<1 \qquad (6-1)$$

Further, it is desirable that the focal length f5 of the fifth lens L5 and the focal length f of the whole system satisfy the following conditional expression (7).

$$-4<f/f5<-0.2 \qquad (7)$$

The conditional expression (7) defines a desirable numerical range of a ratio of the focal length f of the whole system to the focal length f5 of the fifth lens L5. By maintaining the refractive power of the fifth lens L5 such that f/f5 is greater than the lower limit of the conditional expression (7), the refractive power of the fifth lens L5 does not become excessively strong relative to the positive refractive power of the whole system, and thus, especially at the medium angle of view, it is possible to prevent the angle of incidence of rays, which pass through the optical system and are incident onto the image formation surface (imaging device), from becoming large. By securing the refractive power of the fifth lens L5 such that f/f5 is less than the upper limit of the conditional expression (7), the refractive power of the fifth lens L5 does not become excessively weak relative to the refractive power of the whole system, and thus it is possible to appropriately reduce the total length while satisfactorily correcting a curvature of field. In order to further enhance this effect, when the composite refractive power of the first to third lenses L1 to L3 is positive, it is more desirable to satisfy the conditional expression (7-1).

$$-3<f/f5<-0.4 \qquad (7-1)$$

Further, it is desirable that the focal length f of the whole system, the half angle of view ω, and the paraxial radius of curvature R5r of the image side surface of the fifth lens L5 satisfy the following conditional expression (8).

$$0.5<f \cdot \tan \omega / R5r<10 \qquad (8)$$

The conditional expression (8) defines a desirable numerical range of a ratio of the paraxial image height (f·tan ω) to the paraxial radius of curvature R5r of the image side surface of the fifth lens L5. By setting the paraxial image height (f·tan ω) relative to the paraxial radius of curvature R5r of the image side surface of the fifth lens L5 such that f·tan ω/R5r is greater than the lower limit of the conditional expression (8), an absolute value of the paraxial radius of curvature R5r of the image side surface of the fifth lens L5, which is a surface of the imaging lens closest to the image side, does not become excessively large relative to the paraxial image height (f·tan ω), and thus, it is possible to sufficiently correct a curvature of field while reducing the total length. Further, by setting the paraxial image height (f·tan ω) relative to the paraxial radius of curvature R5r of the image side surface of the fifth lens L5 such that f·tan ω/R5r is less than the upper limit of the conditional expression (8), the absolute value of the paraxial radius of curvature R5r of the image side surface of the fifth lens L5, which is a surface of the imaging lens closest to the image side, does not become excessively small relative to the paraxial image height (f·tan ω), and thus, especially at the medium angle of view, it is possible to prevent the angle of incidence of rays, which pass through the optical system and are incident onto the image formation surface (imaging device), from becoming large. In order to further enhance this effect, it is desirable to satisfy the conditional expression (8-1).

$$0.7<f \cdot \tan \omega / R5r<3 \qquad (8-1)$$

Further, it is desirable that the focal length f3 of the third lens L3 and the focal length f of the whole system satisfy the following conditional expression (9).

$$-0.9<f/f3<0.7 \qquad (9)$$

The conditional expression (9) defines a desirable numerical range of a ratio of the focal length f of the whole system to the focal length f3 of the third lens L3. When the third lens L3 has a negative refractive power, by maintaining the refractive power of the third lens L3 such that f/f3 is greater than the lower limit of the conditional expression (9), the negative refractive power of the third lens L3 does not become excessively strong relative to the refractive power of the whole system, and thus it is possible to appropriately reduce the total length. When the third lens L3 has a positive refractive power, by securing the refractive power of the third lens L3 such that f/f3 is less than the upper limit of the conditional expression (9), the positive refractive power of the third lens L3 does not become excessively strong relative to the refractive power of the whole system, and thus it is possible to satisfactorily correct a spherical aberration. In order to further enhance this effect, it is more desirable to satisfy the conditional expression (9-1).

$$-0.4<f/f3<0.5 \qquad (9-1)$$

Further, it is desirable that the spacing D7 on the optical axis between the third lens L3 and the fourth lens L4 and the focal length f of the whole system satisfy the following conditional expression (10).

$$0.05<D7/f<0.2 \qquad (10)$$

The conditional expression (10) defines a desirable numerical range of a ratio of the spacing D7 on the optical axis between the third lens L3 and the fourth lens L4 to the focal length f of the whole system. By securing the spacing D7 on the optical axis between the third lens L3 and the fourth lens L4 relative to the focal length f of the whole system such that D7/f is greater than the lower limit of the conditional expression (10), it is possible to appropriately suppress distortion which tends to occur when the total length is reduced. By maintaining the spacing D7 on the optical axis between the third lens L3 and the fourth lens L4 relative to the focal length f of the whole system such that D7/f is less than the upper limit of the conditional expression (10), it is possible to satisfactorily correct astigmatism. In order to further enhance this effect, it is desirable to satisfy the conditional expression (10-1).

$$0.07<D7/f<0.17 \qquad (10-1)$$

Next, referring to FIGS. 2 to 6, imaging lenses according to second to sixth embodiments of the present invention will be described in detail. In the imaging lenses according to the first to sixth embodiments shown in FIGS. 1 to 6, all surfaces of the first to fifth lenses L1 to L5 are formed to be aspheric. As in the first embodiment, the imaging lenses according to the second to sixth embodiments of the present invention substantially consist of, in order from the object side, five lenses of: the first lens L1 that has a positive refractive power and has a meniscus shape which is convex toward the object side; the second lens L2 that has a biconcave shape; the third lens L3 that has a meniscus shape which is convex toward the object side; the fourth lens L4 that has a meniscus shape which is convex toward the image side; and the fifth lens L5 that has a negative refractive power and has at least one inflection point on an image side surface. Hence, in the following first to sixth embodiments, only the different specific configurations of the lenses constituting the respective lens groups will be described. Since the configurations which are common among the first to sixth embodiments respectively have the same effects, configurations and effects thereof will be described in order of the sequence numbers of the embodiments, and the configurations and effects common to the other embodiments will not be repeatedly described but will be omitted.

Figure 2:
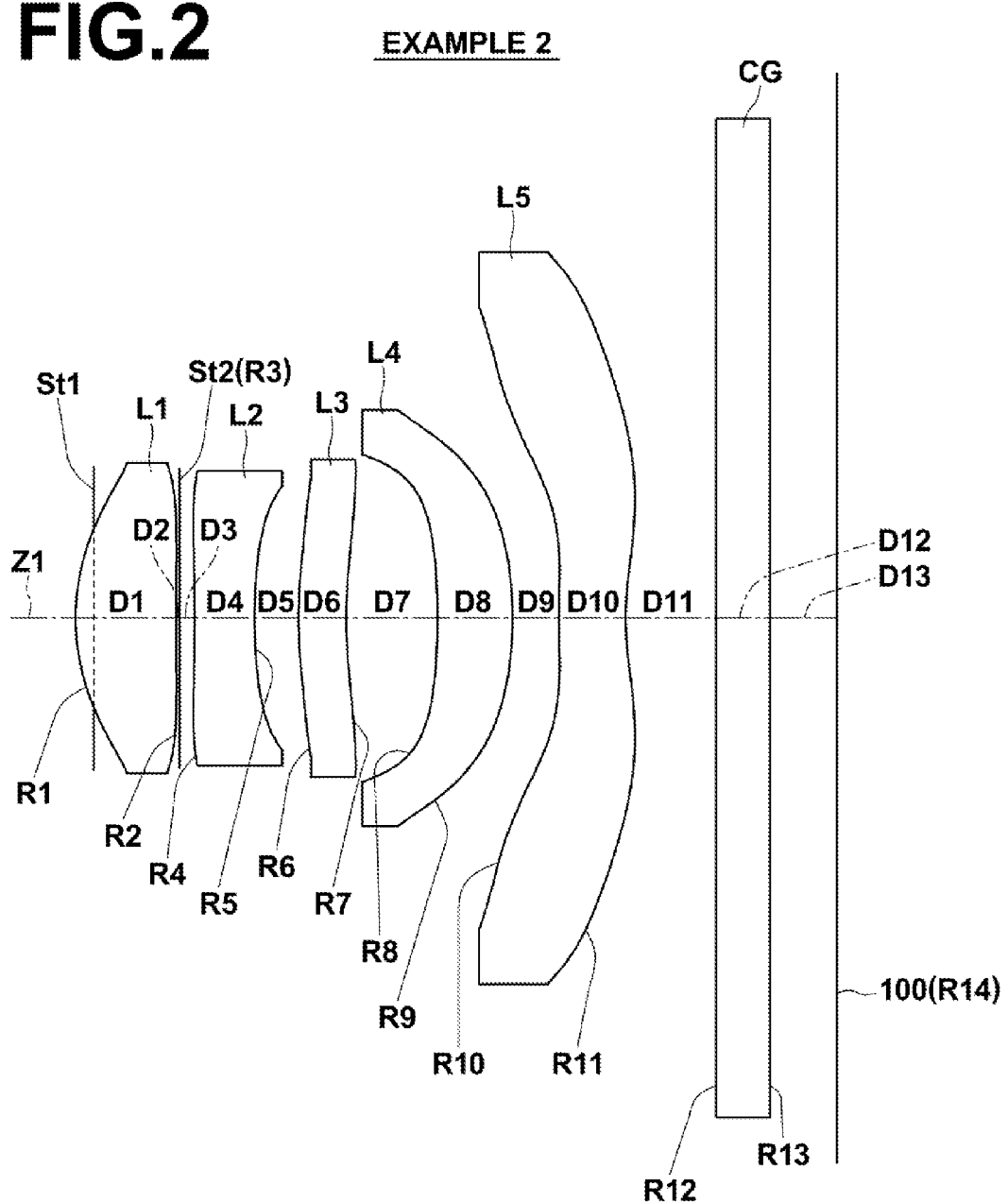
FIG. 2 is a lens cross-sectional view illustrating a second configuration example of an imaging lens according to an embodiment of the present invention and corresponding to Example 2.

In the imaging lens L according to the second embodiment shown in FIG. 2, the lens configurations of the first to fifth lenses L1 to L5 are common to the first embodiment. Therefore, according to the respective lens configurations, it is possible to obtain the same effects as the respective corresponding configurations of the first embodiment.

Figure 3:
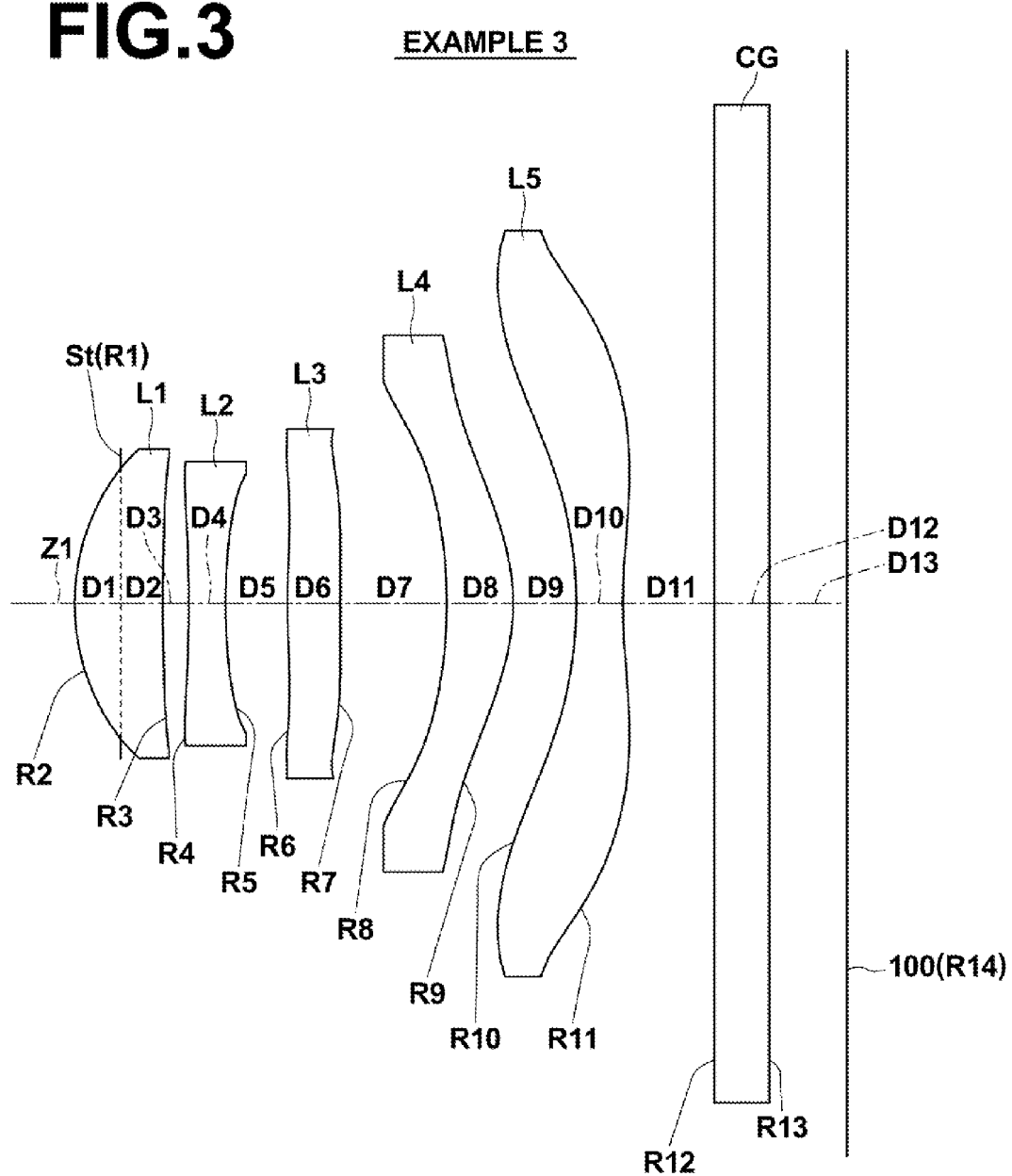
FIG. 3 is a lens cross-sectional view illustrating a third configuration example of an imaging lens according to an embodiment of the present invention and corresponding to Example 3.

As in the third embodiment shown in FIG. 3, the fifth lens L5 may be configured to have a biconcave shape, and the configurations of the first to fifth lenses L1 to L5 may be common to the configurations of the first embodiment except that the fifth lens L5 has a biconcave shape. By making the fifth lens L5 have a biconcave shape, it is possible to set a strong negative refractive power, and thus it is possible to appropriately reduce the total length. Further, in the third embodiment, according to the respective configurations of the first to fifth lenses L1 to L5 common to the first embodiment, it is possible to obtain the same effects as the respective corresponding configurations of the first embodiment.

Figure 4:
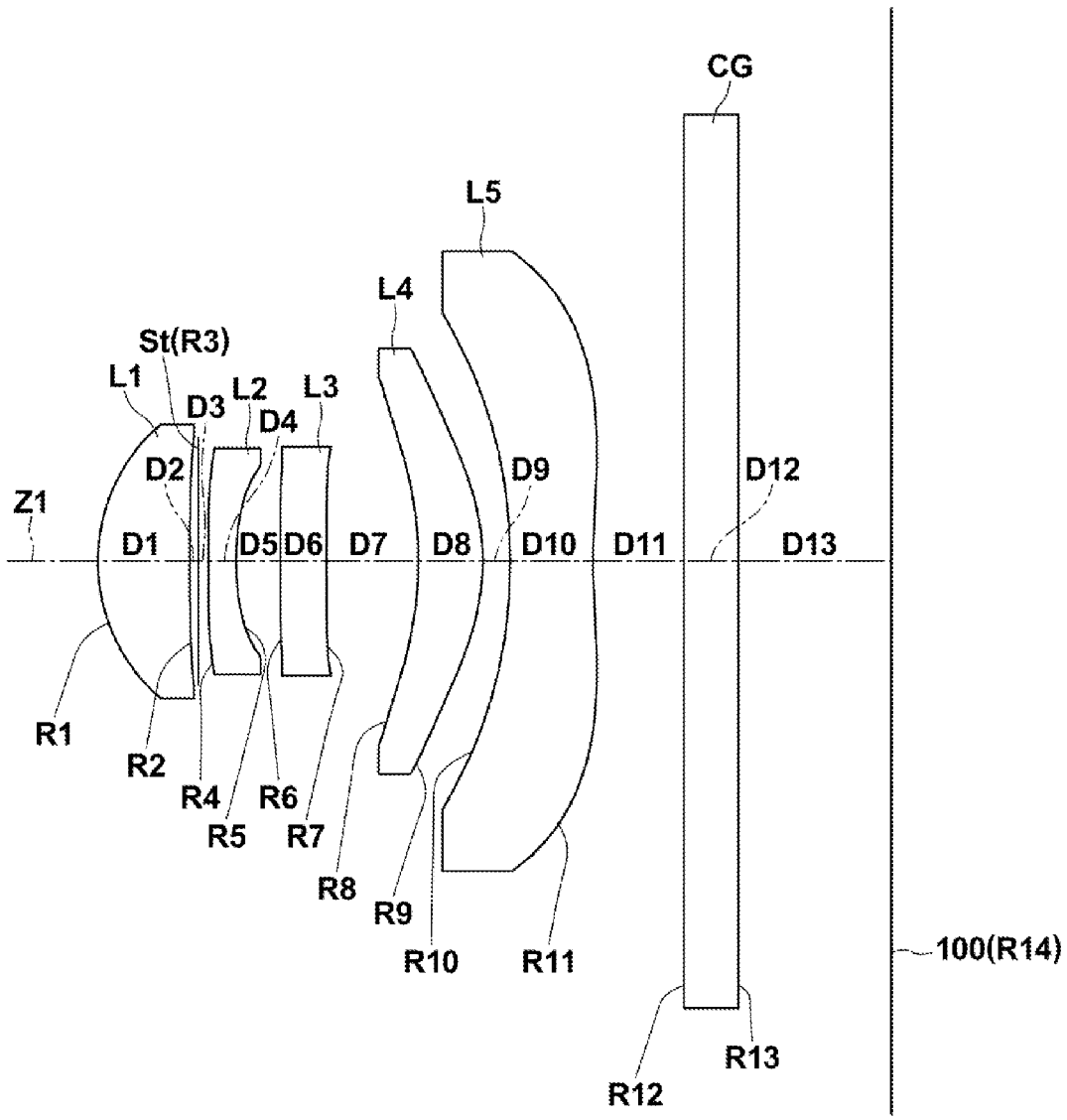
FIG. 4 is a lens cross-sectional view illustrating a fourth configuration example of an imaging lens according to an embodiment of the present invention and corresponding to Example 4.

As in the fourth embodiment shown in FIG. 4, the third lens L3 may be configured to have a negative refractive power in the vicinity of the optical axis, and the configurations of the first to fifth lenses L1 to L5 may be common to the configurations of the third embodiment except that the third lens L3 has a negative refractive power in the vicinity of the optical axis. By making the third lens L3 have a negative refractive power in the vicinity of the optical axis, it is possible to satisfactorily correct a chromatic aberration. Further, in the fourth embodiment, according to the respective configurations of the first to fifth lenses L1 to L5 common to the third embodiment, it is possible to obtain the same effects as the respective corresponding configurations of the third embodiment.

Figure 5:
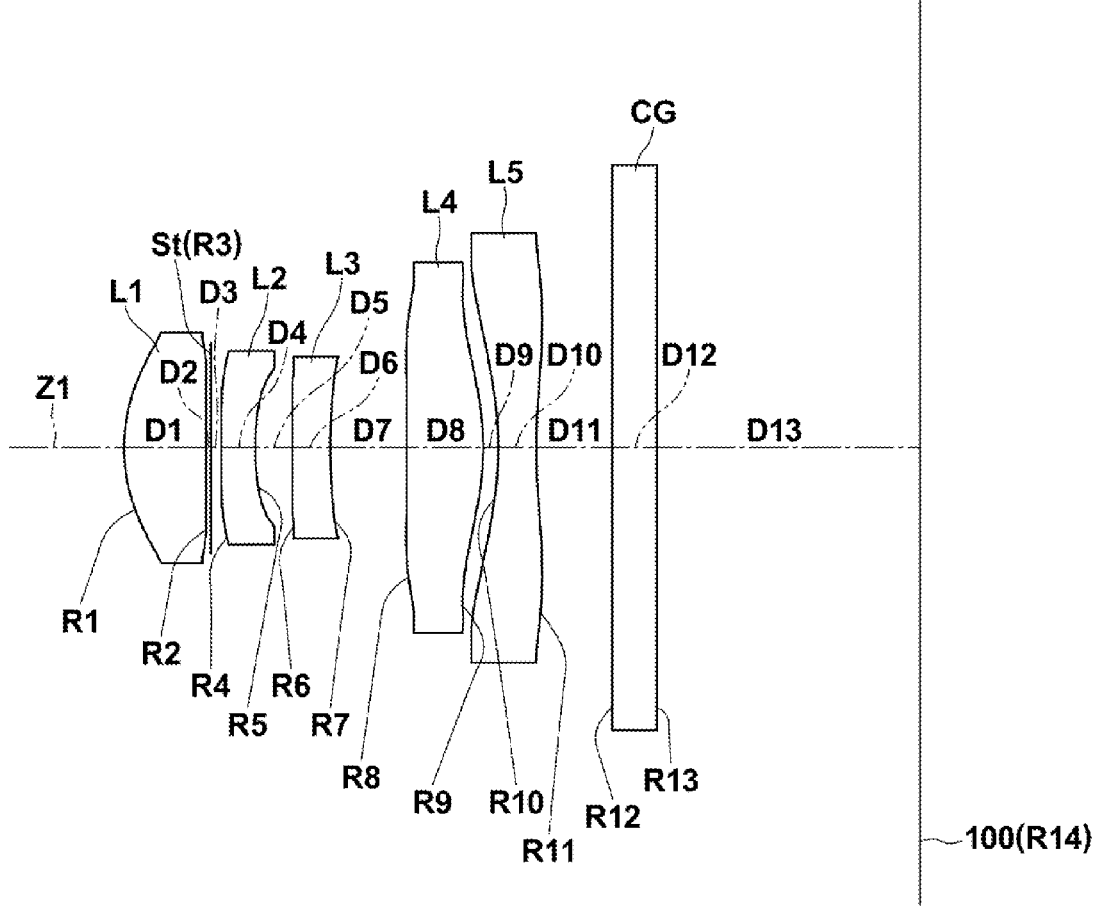
FIG. 5 is a lens cross-sectional view illustrating a fifth configuration example of an imaging lens according to an embodiment of the present invention and corresponding to Example 5.

In the imaging lens L according to the fifth embodiment shown in FIG. 5, the lens configurations of the first to fifth lenses L1 to L5 are common to the fourth embodiment. Therefore, according to the respective lens configurations, it is possible to obtain the same effects as the respective corresponding configurations of the fourth embodiment.

Figure 6:
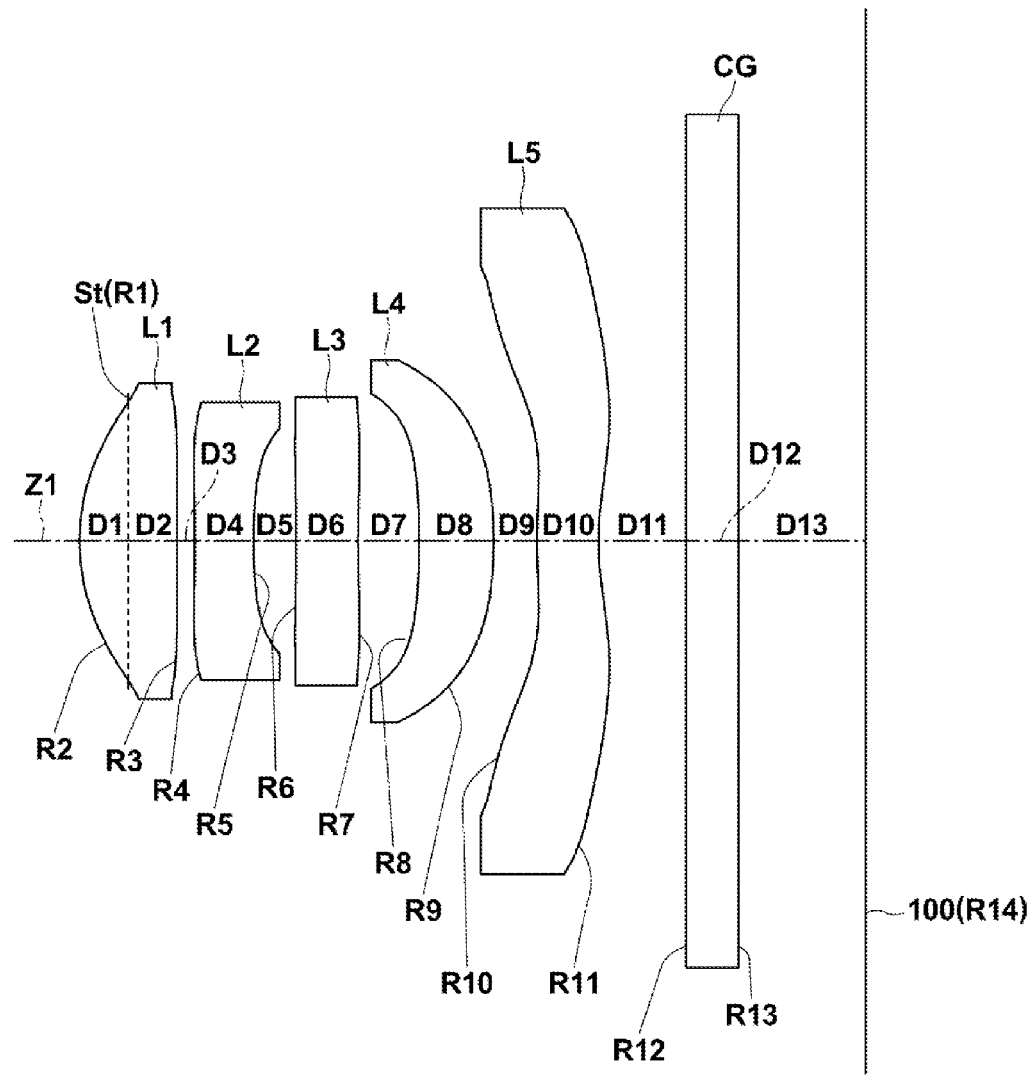
FIG. 6 is a lens cross-sectional view illustrating a sixth configuration example of an imaging lens according to an embodiment of the present invention and corresponding to Example 6.
Figure 7:
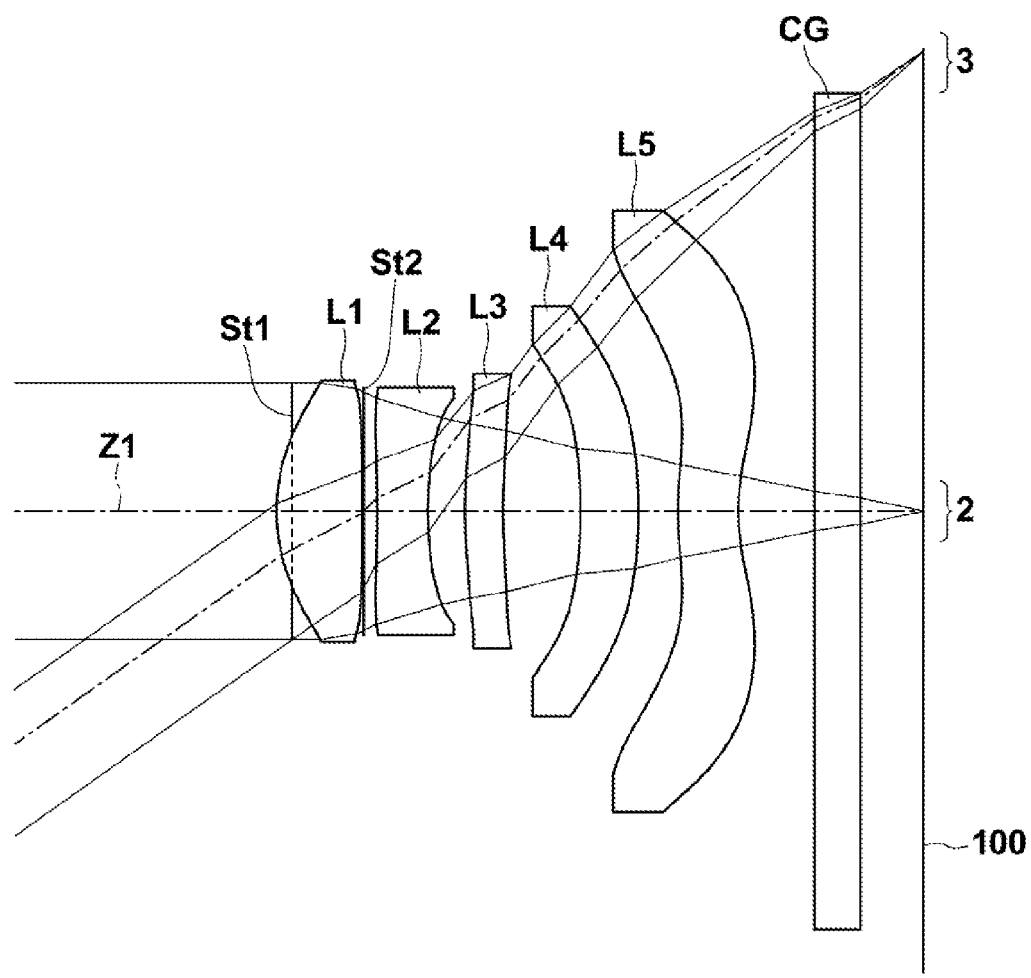
FIG. 7 is a ray diagram of the imaging lens shown in FIG. 1.

As in the sixth embodiment shown in FIG. 6, the fifth lens L5 may be configured to have a meniscus shape which is concave toward the image side, and the configurations of the first to fifth lenses L1 to L5 may be common to the configurations of the fourth embodiment except that the fifth lens L5 has a meniscus shape which is concave toward the image side. By making the fifth lens L5 have a meniscus shape which is concave toward the image side, it is possible to appropriately reduce the total length. Further, in the sixth embodiment, according to the respective configurations of the first to fifth lenses L1 to L5 common to the fourth embodiment, it is possible to obtain the same effects as the respective corresponding configurations of the fourth embodiment.

As described above, according to the imaging lens of the embodiment of the present invention, in the imaging lens which is composed of five lenses as a whole, the configurations of the respective lens elements are optimized. Therefore, it is possible to achieve a lens system having high resolution performance while reducing the total length.

By satisfying appropriately desirable conditions, it is possible to achieve higher imaging performance. Furthermore, according to the imaging apparatus of the embodiment, imaging signals based on an optical image, which is formed by the high-performance imaging lens according to the embodiment, are output. Therefore, it is possible to obtain a photographed image with high resolution in the range from the central angle of view to the peripheral angle of view.

Next, specific numerical examples of the imaging lens according to the embodiment of the present invention will be described. Hereinafter, a plurality of numerical examples will be described collectively.

Table 1 and Table 2, which will be given later, show specific lens data corresponding to the configuration of the imaging lens shown in FIG. 1. Specifically, Table 1 shows basic lens data, and Table 2 shows data on aspheric surfaces. In the lens data shown in Table 1, the column of surface number Si shows the surface number of the i-th surface in the imaging lens of Example 1. The surface of the lens element closest to the object side is the first surface (the aperture stop St is the first), and surface numbers sequentially increase toward the image side. The column of the radius of curvature Ri shows values (mm) of the radius of curvature of i-th surface from the object side to correspond to the reference sign Ri in FIG. 1. Likewise, the column of the on-axis surface spacing Di shows spaces (mm) on the optical axis between the i-th surface Si and the (i+1) th surface Si+1 on the optical axis from the object side. The column of Ndj shows values of the refractive index of the j-th optical element from the object side for the d-line (587.56 nm). The column of vdj shows values of the Abbe number of the j-th optical element from the object side for the d-line. It should be noted that, in each piece of lens data, as various data items, values of the focal length f of the whole system (mm), the back focal length Bf (mm), and the total lens length TL (mm) are respectively shown. In addition, the back focal length Bf indicates an air-converted value, and likewise, in the total lens length TL, the back focal length portion uses an air-converted value.

In the imaging lens according to Example 1, both surfaces of each of the first to fifth lenses L1 to L5 are aspheric. In the basic lens data shown in Table 1, the radii of curvature of these aspheric surfaces are represented as numerical values of the radius of curvature near the optical axis (paraxial radius of curvature).

Table 2 shows aspheric surface data in the imaging lens system according to Example 1. In the numerical values represented as the aspheric surface data, the reference sign "E" means that a numerical value following this is a "exponent" having a base of 10 and that this numerical value having a base of 10 and expressed by an exponential function is multiplied by a numerical value before the "E". For example, this means that "1.0E-02" is "$1.0 \times 10^{-2}$".

As aspheric surface data, values of coefficients Ai and KA in the aspheric surface expression represented by the following expression (A) are shown. Specifically, Z represents the length (mm) of a perpendicular from a point on an aspheric surface at height h from an optical axis to a plane that contacts with the vertex of the aspheric surface (the plane perpendicular to the optical axis).

$$Z = C \cdot h^2 / \{1 + (1 - KA \cdot C^2 \cdot h^2)^{1/2}\} + \Sigma Ai \cdot h^i \quad (A)$$

Here,

Z is a depth of the aspheric surface (mm), h is a distance (height) from the optical axis to the lens surface (mm), C is a paraxial curvature=1/R (R: a paraxial radius of curvature), Ai is an i-th order aspheric surface coefficient (i is an integer equal to or greater than 3), and KA is an aspheric surface coefficient.

As in the imaging lens according to the above-mentioned Example 1, Tables 3 to 12 show specific lens data as Examples 2 to 6, corresponding to the configuration of the imaging lenses shown in FIGS. 2 to 6. In the imaging lenses according to Examples 1 to 6, both surfaces of each of the first to fifth lenses L1 to L5 are aspheric.

Figure 8:
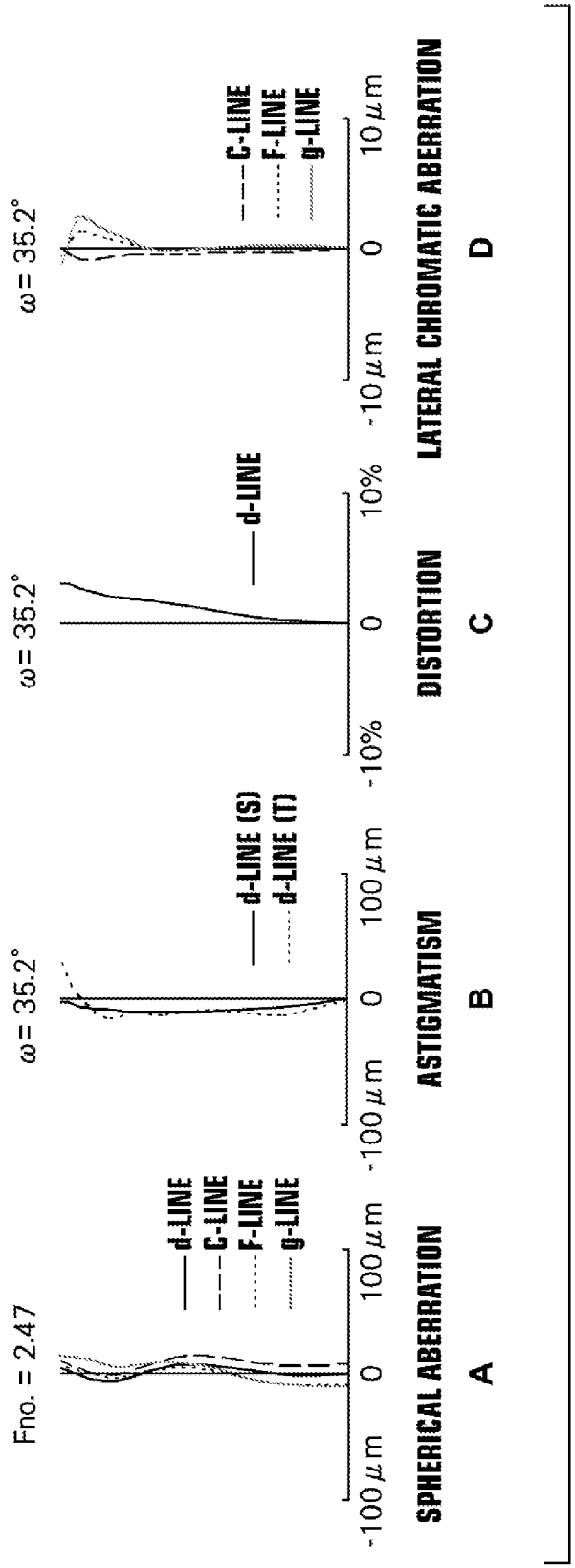
FIG. 8 is an aberration diagram illustrating various aberrations of an imaging lens according to Example 1 of the present invention, where Section A shows a spherical aberration, Section B shows astigmatism (curvature of field), Section C shows distortion, and Section D shows a lateral chromatic aberration.

In Example 1, a flare stop having a diameter of 1.675 mm is disposed at a position of 0.101 mm from the vertex of the surface of the first lens L1 to the image side, and in Example 2, a flare stop having a diameter of 1.670 mm is disposed at a position of 0.101 ram from the vertex of the surface of the first lens L1 to the image side. But the descriptions of these flare stops are omitted in Tables 1 and 3. FIG. 8, Section A to Section D show a spherical aberration, astigmatism (curvature of field), distortion (a distortion aberration), and a lateral chromatic aberration (a chromatic aberration of magnification) in the imaging lens of Example 1, respectively. Each aberration diagram illustrating a spherical aberration, astigmatism (curvature of field), and distortion (a distortion aberration) shows an aberration for the d-line (a wavelength of 587.56 nm) as a reference wavelength. The diagram of a spherical aberration diagram and the diagram of a lateral chromatic aberration diagram show also aberrations for the F-line (a wavelength of 486.1 nm) and the C—line (a wavelength of 656.27 nm). The diagram of a spherical aberration also shows an aberration for the g-line (a wavelength of 435.83 nm). In the diagram of astigmatism, the solid line indicates an aberration in the sagittal direction (5), and the broken line indicates an aberration in the tangential direction (T). Fno. indicates an F-number, and ω indicates a half angle of view.

Figure 9:
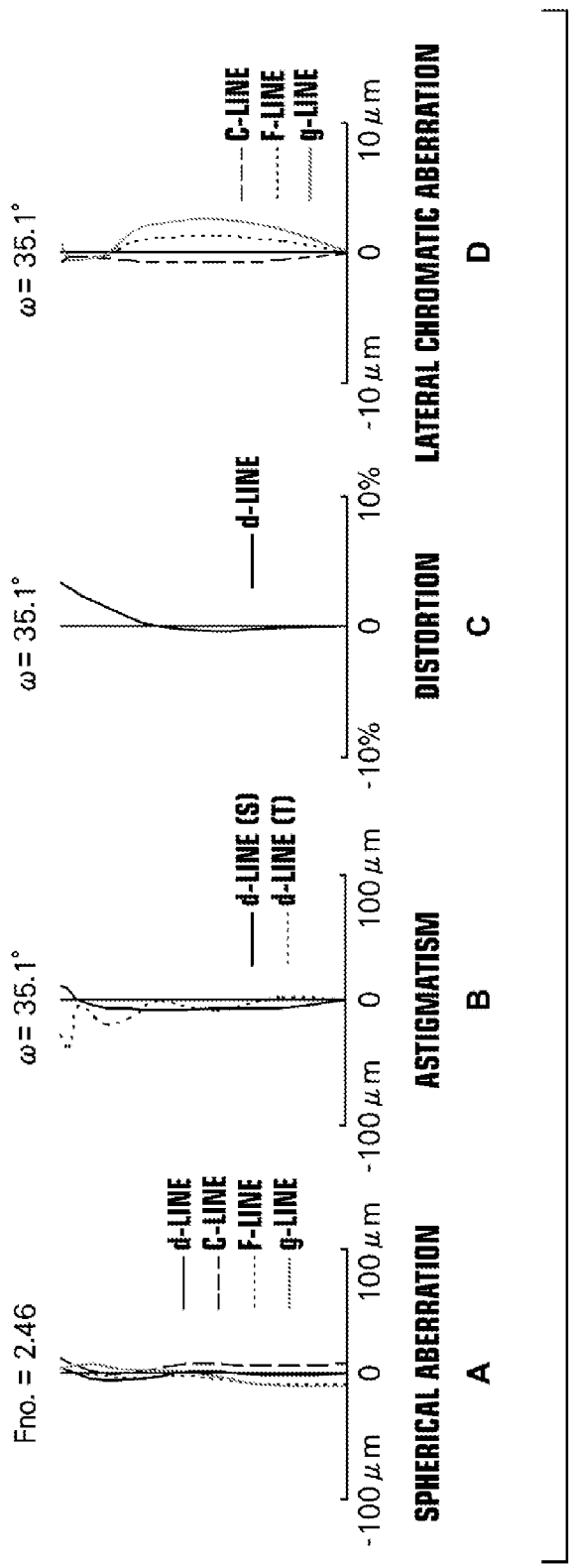
FIG. 9 is an aberration diagram illustrating various aberrations of an imaging lens according to Example 2 of the present invention, where Section A shows a spherical aberration, Section B shows astigmatism (curvature of field), Section C shows distortion, and Section D shows a lateral chromatic aberration.
Figure 10:
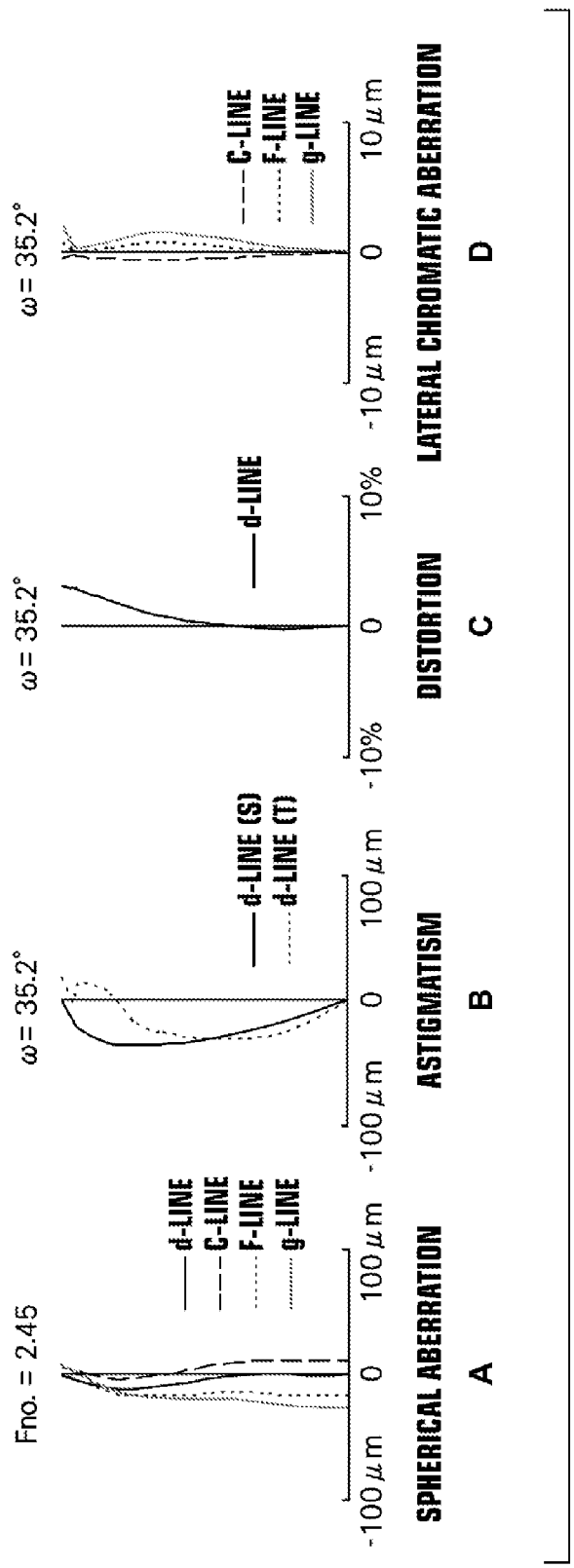
FIG. 10 is an aberration diagram illustrating various aberrations of an imaging lens according to Example 3 of the present invention, where Section A shows a spherical aberration, Section B shows astigmatism (curvature of field), Section C shows distortion, and Section D shows a lateral chromatic aberration.
Figure 11:
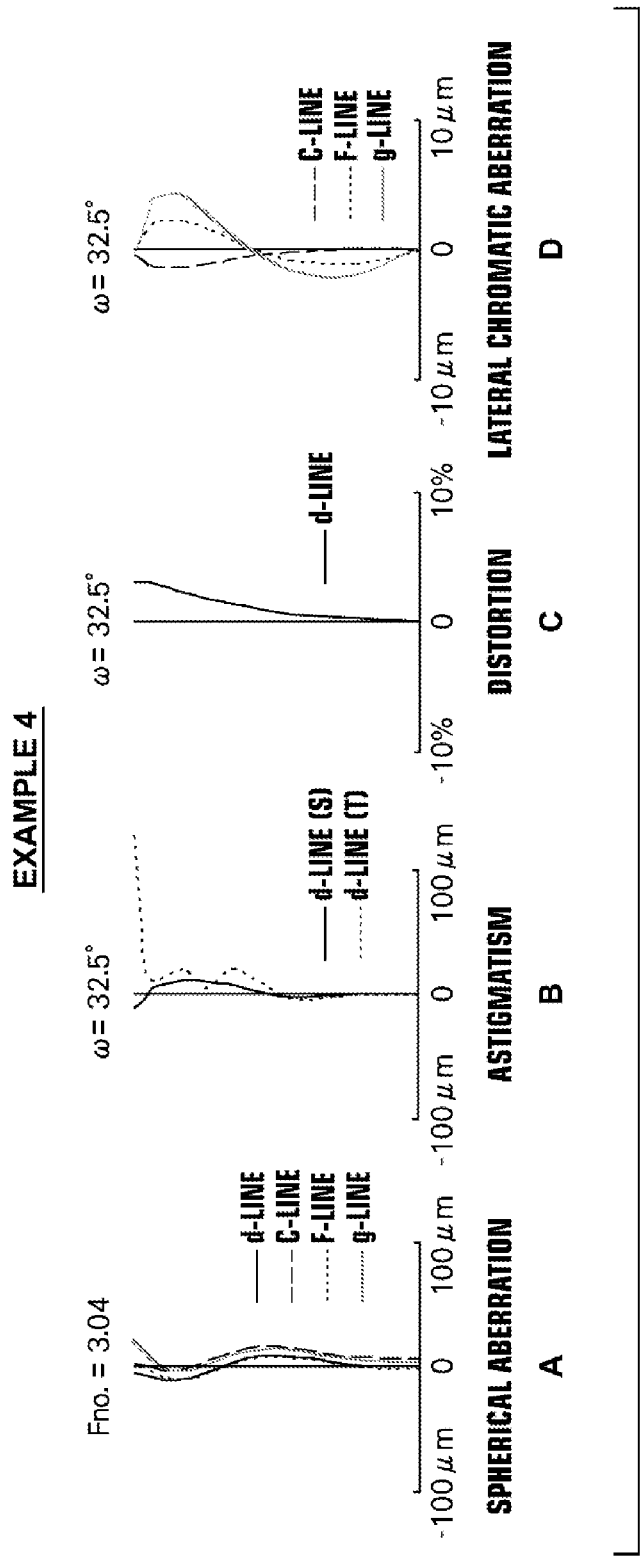
FIG. 11 is an aberration diagram illustrating various aberrations of an imaging lens according to Example 4 of the present invention, where Section A shows a spherical aberration, Section B shows astigmatism (curvature of field), Section C shows distortion, and Section D shows a lateral chromatic aberration.
Figure 12:
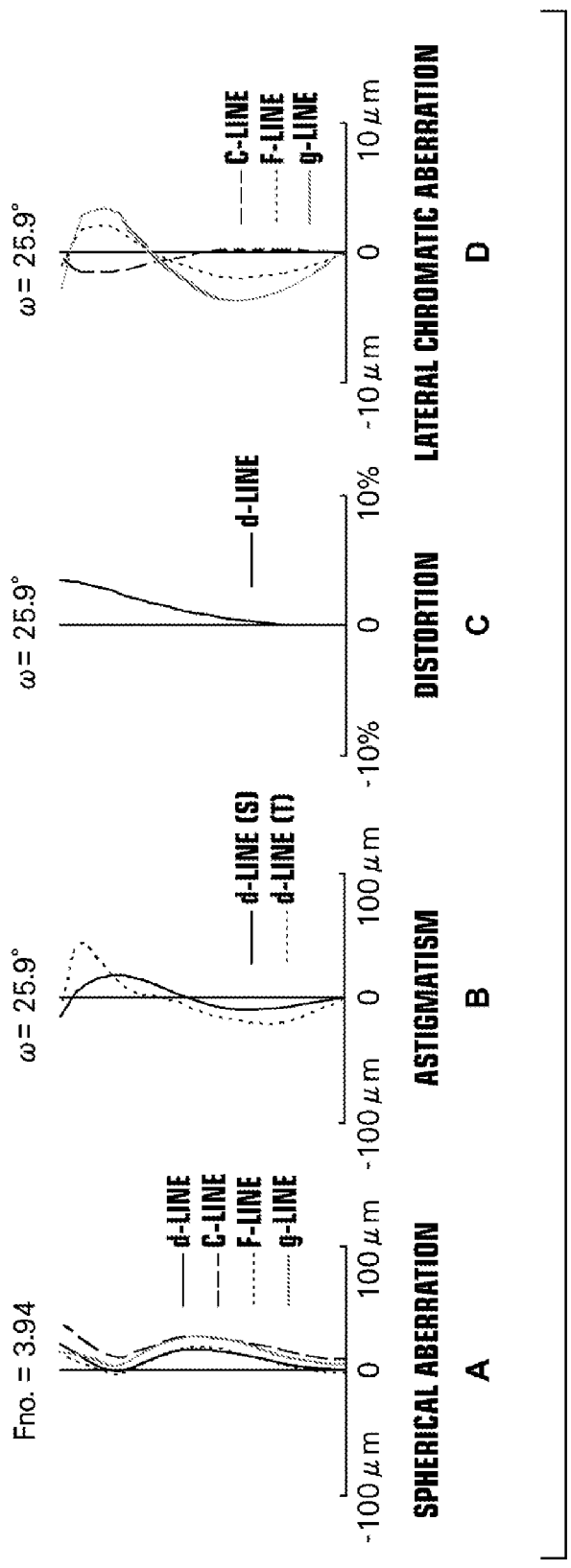
FIG. 12 is an aberration diagram illustrating various aberrations of an imaging lens according to Example 5 of the present invention, where Section A shows a spherical aberration, Section B shows astigmatism (curvature of field), Section C shows distortion, and Section D shows a lateral chromatic aberration.
Figure 13:
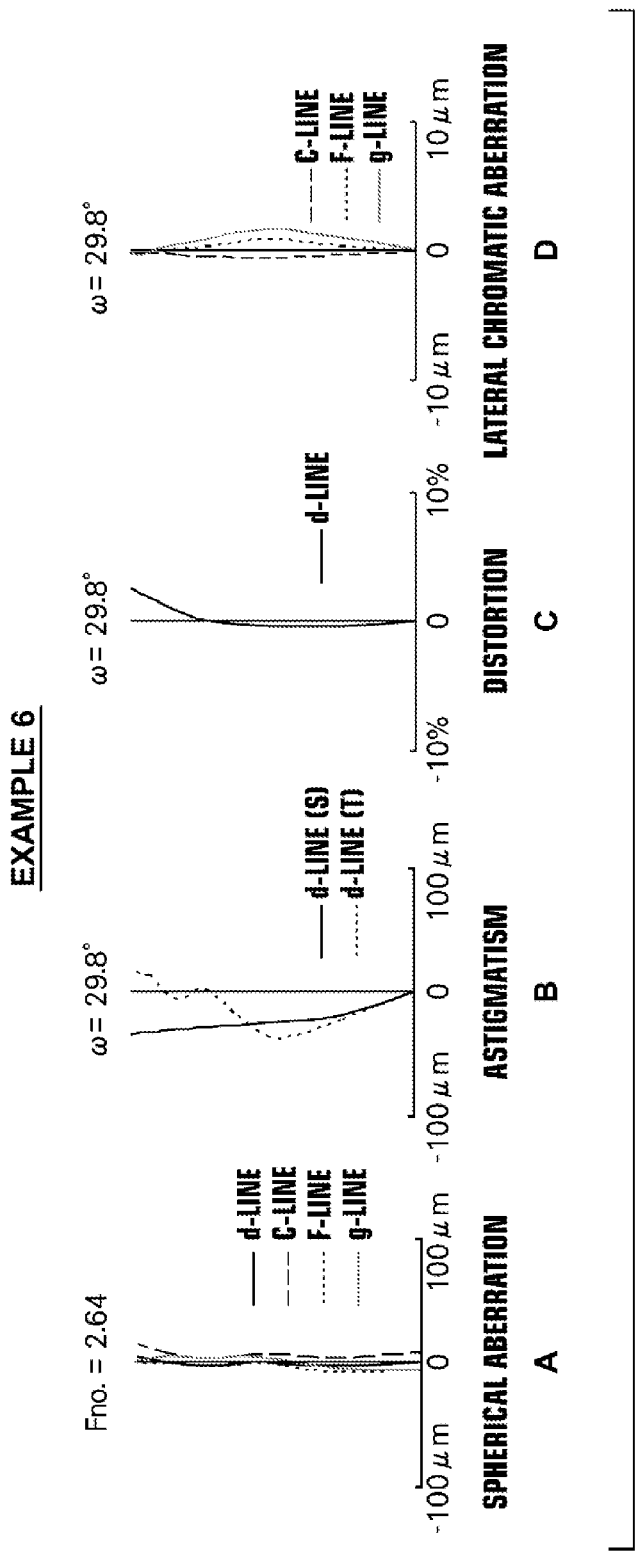
FIG. 13 is an aberration diagram illustrating various aberrations of an imaging lens according to Example 6 of the present invention, where Section A shows a spherical aberration, Section B shows astigmatism (curvature of field), Section C shows distortion, and Section D shows a lateral chromatic aberration.

Likewise, FIG. 9, Section A to D to FIG. 13, Section A to D show various aberrations of the imaging lenses of Examples 2 to 6.

Table 13 collectively shows values of the conditional expressions (1) and (10) of Examples 1 to 6 according to the present invention.

As can be seen from the above-mentioned numerical value data and aberration diagrams, in each example, high imaging performance is achieved while the total length is reduced.

The imaging lens of the present invention is not limited to the above-mentioned embodiments and examples, and may be modified to various forms. For example, the values of the radius of curvature, the on-axis surface spacing, the refractive index, the Abbe number, the aspheric surface coefficient, and the like of the lens elements are not limited to the values shown in the numerical examples, and may have different values.

Further, in the description of each of all the examples, it is a premise that the imaging lens is used with fixed focus, but it may be possible to adopt a configuration in which focus is adjustable. For example, the imaging lens may be configured in such a manner that autofocusing is possible by extending the whole lens system or by moving some lenses on the optical axis.

TABLE 1

EXAMPLE 1
f = 4.126, Bf = 1.111, TL = 4.137

| Si | Ri | Di | ndj | vdj |
|---|---|---|---|---|
| *1 | 1.23831 | 0.557 | 1.54488 | 54.87 |
| *2 | 93.70148 | 0.015 | | |
| 3 (APERTURE STOP) | ∞ | 0.085 | | |
| *4 | −12.66265 | 0.334 | 1.63351 | 23.63 |
| *5 | 2.60879 | 0.243 | | |
| *6 | 3.15915 | 0.253 | 1.63351 | 23.63 |
| *7 | 4.55163 | 0.506 | | |
| *8 | −3.56285 | 0.379 | 1.63351 | 23.63 |
| *9 | −3.58353 | 0.258 | | |
| *10 | 1.98236 | 0.396 | 1.54488 | 54.87 |
| *11 | 1.23910 | 0.500 | | |
| 12 | ∞ | 0.300 | 1.51633 | 64.14 |
| 13 | ∞ | 0.413 | | |
| 14 | ∞ | | | |

*ASPHERIC SURFACE

TABLE 2

EXAMPLE 1 - ASPHERIC SURFACE DATA

| SURFACE NUMBER | KA | A4 | A6 | A8 |
|---|---|---|---|---|
| 1 | 9.7589122E−01 | −2.6729118E−02 | 4.7204449E−02 | −2.6218167E−01 |
| 2 | 1.0000090E+00 | −7.9154953E−02 | 8.3384460E−02 | −6.1197888E−03 |
| 3 | −1.6800000E+00 | −3.8300234E−02 | 3.7458150E−01 | −2.7551593E−01 |
| 4 | 3.1182039E+00 | −7.3707562E−02 | 1.2126243E+00 | −4.9458531E+00 |
| 5 | 6.9999076E−01 | −2.6329653E−01 | 2.4873169E−01 | 6.8422800E−02 |
| 6 | 1.0000249E+00 | −1.9056021E−01 | 1.2088188E−01 | 7.8189995E−02 |
| 7 | −2.1000000E+01 | −7.2840681E−02 | −3.3284653E−01 | 5.2042516E−01 |
| 8 | −2.8556198E+00 | −1.2163394E−01 | 1.7522262E−02 | −1.0676210E−02 |
| 9 | −1.4000005E+01 | −4.3055564E−01 | 2.7976405E−01 | −9.4994461E−02 |
| 10 | −5.9077860E+00 | −2.7520458E−01 | 2.0923136E−01 | −1.1952221E−01 |

TABLE 2-continued

EXAMPLE 1 - ASPHERIC SURFACE DATA

| | A10 | A12 | A14 | A16 |
|---|---|---|---|---|
| 1 | 4.0997871E−01 | −4.5226437E−01 | 1.0665075E−01 | −8.1871346E−02 |
| 2 | −2.0357974E−01 | −9.6694982E−01 | 2.1915571E+00 | −1.2401354E+00 |
| 3 | −3.8447870E−01 | −3.1121039E−01 | 2.3020800E+00 | −1.6056084E+00 |
| 4 | 1.7803254E+01 | −3.9765240E+01 | 4.8323265E+01 | −2.3566996E+01 |
| 5 | 4.9267886E−01 | −2.4199414E+00 | 3.4571789E+00 | −1.8021267E+00 |
| 6 | 1.4186946E−01 | −2.2779898E−01 | −1.5644448E−02 | 4.4672840E−02 |
| 7 | −4.7544883E−01 | 2.5326186E−01 | −1.5953212E−02 | −2.5450777E−02 |
| 8 | 3.2819033E−02 | −8.8256572E−03 | −7.6808797E−03 | 3.0337699E−03 |
| 9 | 1.2737276E−02 | 1.7450700E−03 | −6.1232629E−04 | 3.3350877E−05 |
| 10 | 4.5143417E−02 | −1.0711328E−02 | 1.3898779E−03 | −7.1397774E−05 |

TABLE 3

EXAMPLE 2
f = 4.119, Bf = 1.069, TL = 4.120

| Si | Ri | Di | ndj | vdj |
|---|---|---|---|---|
| *1 | 1.23597 | 0.557 | 1.54488 | 54.87 |
| *2 | 15.97054 | 0.020 | | |
| 3 (APERTURE STOP) | ∞ | 0.081 | | |
| *4 | −19.29047 | 0.334 | 1.63351 | 23.63 |
| *5 | 3.10552 | 0.243 | | |
| *6 | 2.53139 | 0.265 | 1.54488 | 54.87 |
| *7 | 2.70709 | 0.506 | | |
| *8 | −3.97938 | 0.417 | 1.63351 | 23.63 |
| *9 | −2.24497 | 0.258 | | |
| *10 | 5.09366 | 0.370 | 1.63351 | 23.63 |
| *11 | 1.57691 | 0.500 | | |
| 12 | ∞ | 0.300 | 1.51633 | 64.14 |
| 13 | ∞ | 0.372 | | |
| 14 | ∞ | | | |

*ASPHERIC SURFACE

TABLE 5

EXAMPLE 3
f = 4.117, Bf = 1.123, TL = 4.117

| Si | Ri | Di | ndj | vdj |
|---|---|---|---|---|
| 1 (APERTURE STOP) | ∞ | −0.252 | | |
| *2 | 1.21258 | 0.482 | 1.54488 | 54.87 |
| *3 | 11.57312 | 0.141 | | |
| *4 | −7.67379 | 0.202 | 1.63351 | 23.63 |
| *5 | 3.45544 | 0.338 | | |
| *6 | 5.09875 | 0.287 | 1.63351 | 23.63 |
| *7 | 14.62892 | 0.582 | | |
| *8 | −2.51969 | 0.364 | 1.54488 | 54.87 |
| *9 | −1.10708 | 0.345 | | |
| *10 | −2.07885 | 0.253 | 1.54488 | 54.87 |
| *11 | 2.90776 | 0.500 | | |
| 12 | ∞ | 0.300 | 1.51633 | 64.14 |
| 13 | ∞ | 0.425 | | |
| 14 | ∞ | | | |

*ASPHERIC SURFACE

TABLE 4

EXAMPLE 2 - ASPHERIC SURFACE DATA

| SURFACE NUMBER | KA | A4 | A6 | A8 |
|---|---|---|---|---|
| 1 | −6.9000900E−01 | 7.8401227E−02 | 4.8724169E−02 | −3.1032450E−01 |
| 2 | 1.0000000E+00 | −1.4179856E−01 | 1.2622836E−01 | −3.1360196E−02 |
| 3 | 1.0000000E+01 | −7.7610199E−02 | 4.1593603E−01 | −1.7738968E−01 |
| 4 | 3.1182039E+00 | −3.5937525E−02 | 9.8686897E−01 | −3.2805080E+00 |
| 5 | 3.1872442E−01 | −2.7915128E−01 | 2.8423559E−01 | −2.1820589E−01 |
| 6 | −5.0999884E−01 | −1.9620120E−01 | 1.1264694E−01 | −3.2207096E−01 |
| 7 | −8.8745315E−01 | −7.2840681E−02 | −6.8446726E−01 | 2.6980741E+00 |
| 8 | −2.3946942E+00 | −2.3349899E−01 | 8.5626683E−02 | −8.4780380E−02 |
| 9 | −1.0079967E+01 | −7.6948035E−01 | 7.1798466E−01 | −2.9903150E+00 |
| 10 | −1.3546000E+01 | −3.4848072E−01 | 2.9750460E−01 | −1.5469280E−01 |

| | A10 | A12 | A14 | A16 |
|---|---|---|---|---|
| 1 | 7.3975458E−01 | −1.2853745E+00 | 1.0201759E+00 | −4.1573183E−01 |
| 2 | −3.1147565E−01 | −2.5924164E−01 | 1.1354658E+00 | −7.4361120E−01 |
| 3 | −7.7126641E−01 | 9.2770917E−01 | 5.6561007E−01 | −8.0673585E−01 |
| 4 | 1.1724933E+01 | −2.7522413E+01 | 3.6438963E+01 | −1.9556633E+01 |
| 5 | 6.4639121E−01 | −1.6044352E+00 | 2.2177373E+00 | −1.1204967E+00 |
| 6 | 8.7809423E−01 | −1.2333009E+00 | 8.1561032E−01 | −1.8182400E−01 |
| 7 | −8.5699151E+00 | 1.3930093E+01 | −1.1707336E+01 | 3.6414691E+00 |
| 8 | 1.8481830E−02 | −7.3019643E−02 | 6.5021917E−02 | −6.0493130E−03 |
| 9 | 5.3075607E−02 | 1.4586291E−03 | −1.9559157E−03 | 2.1244648E−04 |
| 10 | 5.0295407E−02 | −9.7601077E−03 | 1.0070371E−03 | −4.1856063E−05 |

TABLE 6

EXAMPLE 3 - ASPHERIC SURFACE DATA

| SURFACE NUMBER | KA | A4 | A6 | A8 |
|---|---|---|---|---|
| 1 | −5.9868050E+00 | 4.8641128E−01 | −7.9546902E−01 | 2.1017252E+00 |
| 2 | 1.9240955E+00 | −5.3853512E−02 | 2.1154063E−01 | −4.4017448E−01 |
| 3 | 1.0921760E+01 | −9.5725484E−02 | 7.5943447E−01 | −1.9145869E+00 |
| 4 | 4.2702877E+00 | −7.3659102E−02 | 7.7800384E−01 | −1.3378460E+00 |
| 5 | −3.0446805E−01 | −2.3909795E−01 | 3.8056203E−02 | −5.1291279E−02 |
| 6 | −4.1652815E+00 | −2.0189182E−01 | 1.5477070E−01 | −8.7156700E−01 |
| 7 | 1.5660356E−01 | 5.7683409E−02 | −3.0103142E−01 | 4.8387321E−01 |
| 8 | −2.5416033E+00 | 1.0901372E−01 | −2.8841662E−01 | 4.5116212E−01 |
| 9 | −2.8886199E+01 | −2.1705115E−01 | 1.5308753E−01 | −3.9562058E−02 |
| 10 | −9.1851222E+00 | −2.2493967E−01 | 1.6877855E−01 | −9.7203848E−02 |

| | A10 | A12 | A14 | A16 |
|---|---|---|---|---|
| 1 | −4.6930095E+00 | 7.3788098E+00 | −6.6387072E+00 | 2.5968201E+00 |
| 2 | 7.2411728E−01 | −5.0309707E−01 | −2.0972869E−01 | 4.1332784E−01 |
| 3 | 3.6385814E+00 | −4.9896476E+00 | 4.2590990E+00 | −1.6942132E+00 |
| 4 | 4.0930579E−01 | 5.4769361E+00 | −1.1317295E+01 | 7.5185167E+00 |
| 5 | 5.3246530E−01 | −1.2087019E+00 | 2.1064446E+00 | −1.3514237E+00 |
| 6 | 2.7793661E+00 | −4.6106123E+00 | 4.3246333E+00 | −1.6422211E+00 |
| 7 | −5.4851430E−01 | 3.6013932E−01 | −9.6281745E−02 | 3.4936818E−03 |
| 8 | −3.2780850E−01 | 1.2031213E−01 | −2.1115167E−02 | 1.2566134E−03 |
| 9 | −6.4447571E−05 | 2.4915794E−03 | −5.5626637E−04 | 4.0995922E−05 |
| 10 | 3.7535798E−02 | −9.2150833E−03 | 1.2851713E−03 | −7.5129992E−05 |

TABLE 7

EXAMPLE 4
f = 4.555, Bf = 1.538, TL = 4.260

| Si | Ri | Di | ndj | vdj |
|---|---|---|---|---|
| *1 | 0.99476 | 0.506 | 1.54488 | 54.87 |
| *2 | 253.01381 | 0.046 | | |
| 3 (APERTURE STOP) | ∞ | 0.056 | | |
| *4 | −22.24707 | 0.152 | 1.63351 | 23.63 |
| *5 | 1.69768 | 0.243 | | |
| *6 | 253.00000 | 0.253 | 1.63351 | 23.63 |
| *7 | 39.05374 | 0.506 | | |
| *8 | −1.90297 | 0.354 | 1.63351 | 23.63 |
| *9 | −1.16022 | 0.151 | | |
| *10 | −3.16206 | 0.455 | 1.54488 | 54.87 |
| *11 | 3.61431 | 0.500 | | |
| 12 | ∞ | 0.300 | 1.51633 | 64.14 |
| 13 | ∞ | 0.840 | | |
| 14 | ∞ | | | |

*ASPHERIC SURFACE

TABLE 8

EXAMPLE 4 - ASPHERIC SURFACE DATA

| SURFACE NUMBER | KA | A4 | A6 | A8 |
|---|---|---|---|---|
| 1 | 1.1921937E+00 | −2.8552244E−02 | 1.9464672E−02 | −1.7622814E−01 |
| 2 | −7.2205120E+00 | 1.0009125E−01 | 5.6965587E−02 | −1.2128920E−04 |
| 3 | −1.6800098E+00 | 4.3862266E−01 | −2.5955621E−01 | −3.0871421E−01 |
| 4 | 3.1182039E+00 | 4.9953409E−01 | 7.4979015E−01 | −4.0780165E+00 |
| 5 | −1.6495744E+01 | −7.5670799E−04 | 4.6703185E−01 | 6.5512652E−03 |
| 6 | 9.9999036E−01 | 2.7502524E−02 | 2.3242844E−01 | −7.5662102E−02 |
| 7 | −6.1085232E+00 | −7.2840681E−02 | −6.1939901E−02 | 4.0213149E−01 |
| 8 | −1.9317843E+00 | 2.9226488E−03 | 1.6279485E−02 | −1.1936707E−02 |
| 9 | −1.4000001E+01 | −1.4394163E−01 | 1.2958519E−01 | −6.9903475E−02 |
| 10 | −1.3546000E+01 | −2.3244698E−01 | 1.8331804E−01 | −1.1223612E−01 |

| | A10 | A12 | A14 | A16 |
|---|---|---|---|---|
| 1 | 4.3011057E−01 | −4.4272734E−01 | 9.7079058E−02 | −6.1193103E−02 |
| 2 | −1.7377307E−01 | −9.7305688E−01 | 2.2005578E+00 | −1.2311427E+00 |
| 3 | −4.2662287E−01 | −2.3413149E−01 | 2.5428004E+00 | −1.9963875E+00 |
| 4 | 1.8205811E+01 | −3.8842459E+01 | 6.3021364E+01 | −5.0226037E+01 |
| 5 | 8.6310550E−01 | −8.0002749E−01 | 3.6125413E+00 | −1.5876512E+01 |

TABLE 8-continued

EXAMPLE 4 - ASPHERIC SURFACE DATA

| | | | | |
|---|---|---|---|---|
| 6 | 5.4526971E−02 | −6.2891755E−02 | 2.2916270E−01 | −1.9122565E−01 |
| 7 | −4.7056467E−01 | 2.4130912E−01 | −2.7435913E−02 | −2.7992163E−02 |
| 8 | 2.7648276E−02 | −8.7177546E−03 | −7.5782951E−03 | 1.4110223E−03 |
| 9 | 1.3115167E−02 | 1.8723448E−03 | −5.6945481E−04 | −2.7551420E−06 |
| 10 | 4.4224273E−02 | −1.0817291E−02 | 1.3978168E−03 | −7.0081151E−05 |

TABLE 9

EXAMPLE 5
f = 5.956, Bf = 2.438, TL = 5.171

| Si | Ri | Di | ndj | vdj |
|---|---|---|---|---|
| *1 | 1.12444 | 0.546 | 1.54488 | 54.87 |
| *2 | 252.97534 | 0.030 | | |
| 3 (APERTURE STOP) | ∞ | 0.069 | | |
| *4 | −18.78836 | 0.227 | 1.63351 | 23.63 |
| *5 | 2.25616 | 0.243 | | |
| *6 | 506.45581 | 0.253 | 1.63351 | 23.63 |
| *7 | 4.36560 | 0.506 | | |
| *8 | −99.83715 | 0.506 | 1.63351 | 23.63 |
| *9 | −1.70702 | 0.100 | | |
| *10 | −2.17464 | 0.253 | 1.54488 | 54.87 |
| *11 | 3.61429 | 0.500 | | |
| 12 | ∞ | 0.300 | 1.51633 | 64.14 |
| 13 | ∞ | 1.740 | | |
| 14 | ∞ | | | |

*ASPHERIC SURFACE

TABLE 11

EXAMPLE 6
f = 4.428, Bf = 1.424, TL = 4.387

| Si | Ri | Di | ndj | vdj |
|---|---|---|---|---|
| 1 (APERTURE STOP) | ∞ | −0.278 | | |
| *2 | 1.17174 | 0.557 | 1.54488 | 54.87 |
| *3 | 101.21828 | 0.101 | | |
| *4 | −8.52605 | 0.334 | 1.63351 | 23.63 |
| *5 | 3.10246 | 0.243 | | |
| *6 | 253.12530 | 0.354 | 1.54488 | 54.87 |
| *7 | 7.08468 | 0.350 | | |
| *8 | −4.62732 | 0.427 | 1.63351 | 23.63 |
| *9 | −2.28837 | 0.246 | | |
| *10 | 2.81503 | 0.351 | 1.63351 | 23.63 |
| *11 | 1.45940 | 0.500 | | |
| 12 | ∞ | 0.300 | 1.51633 | 64.14 |
| 13 | ∞ | 0.726 | | |
| 14 | ∞ | | | |

*ASPHERIC SURFACE

TABLE 10

EXAMPLE 5 - ASPHERIC SURFACE DATA

| SURFACE NUMBER | KA | A4 | A6 | A8 |
|---|---|---|---|---|
| 1 | 6.9377302E−01 | −8.6315370E−03 | −2.9322827E−03 | −2.8236519E−01 |
| 2 | 1.0000090E+00 | 1.0299728E−02 | −3.3338883E−02 | −3.5854402E−01 |
| 3 | 9.8073731E+00 | 4.1860316E−01 | 2.4161475E−01 | −7.6083670E−01 |
| 4 | 3.1182039E+00 | 4.6995645E−01 | 1.5149631E+00 | −2.7101440E+00 |
| 5 | 6.1881621E−01 | −1.9777356E−01 | 1.5104859E+00 | −1.5044509E+00 |
| 6 | 9.9999979E−01 | −1.3815608E−01 | 8.2457564E−01 | −4.9516542E−01 |
| 7 | 3.2258104E−01 | −7.2840681E−02 | 1.5663313E−01 | 9.8367802E−02 |
| 8 | −2.6292010E+00 | 1.1379689E−01 | −1.7291781E−02 | 2.9845655E−02 |
| 9 | −1.4000002E+01 | −4.4092972E−02 | 9.9278653E−02 | −7.7922450E−02 |
| 10 | 1.3000586E−01 | −1.8315230E−01 | 1.3758774E−01 | −9.0542240E−02 |

| | A10 | A12 | A14 | A16 |
|---|---|---|---|---|
| 1 | 3.6582042E−01 | −4.2487703E−01 | −2.2631039E−01 | −2.0344291E−02 |
| 2 | −2.1599412E−01 | −4.4977846E−01 | 2.5600140E+00 | −1.9687116E+00 |
| 3 | −7.7068397E−01 | 2.7743135E−01 | 2.0383002E+00 | 7.4259109E−01 |
| 4 | 1.3698992E+01 | −3.8132984E+01 | 5.1107685E+01 | −2.7851932E+01 |
| 5 | 1.4799995E+00 | 1.8815842E+01 | −1.1654772E+02 | 1.7961509E+02 |
| 6 | 2.3119410E+00 | −1.5309306E+01 | 2.6135941E+01 | −1.0762516E+01 |
| 7 | −2.7569022E−01 | 1.7783105E−01 | −4.9261478E−02 | 3.9419268E−03 |
| 8 | 1.7970251E−04 | −2.1611961E−02 | 4.0098433E−03 | 1.4790761E−03 |
| 9 | 2.0967820E−02 | 4.6775947E−03 | −9.1757326E−04 | −4.2752923E−04 |
| 10 | 4.2054637E−02 | −1.3115957E−02 | 2.7031329E−03 | −1.9876871E−04 |

TABLE 12

EXAMPLE 6 - ASPHERIC SURFACE DATA

| SURFACE NUMBER | KA | A4 | A6 | A8 |
|---|---|---|---|---|
| 1 | 3.6898607E−02 | 4.1325089E−02 | 7.7959667E−02 | −3.1320039E−01 |
| 2 | −2.3337736E+01 | −7.0438383E−02 | 1.2689897E−01 | −1.6510709E−02 |
| 3 | 1.4512180E+00 | 1.0524624E−01 | 2.7959740E−01 | −1.2882128E−01 |
| 4 | 3.1182039E+00 | 2.0460167E−01 | 9.3788710E−01 | −3.1083520E+00 |
| 5 | 7.0000900E−01 | −1.7148265E−01 | 2.9051562E−01 | −5.2650666E−02 |
| 6 | 3.5470814E−01 | −1.9176138E−01 | 1.7502659E−01 | −3.4890662E−01 |
| 7 | −2.3602970E+00 | −7.2840681E−02 | −8.4242604E−01 | 2.9509268E+00 |
| 8 | −1.8311731E+00 | −2.6699460E−01 | 9.1126040E−02 | −1.0539776E−01 |
| 9 | 1.0044588E−01 | −7.9144306E−01 | 7.1344844E−01 | −2.9852745E−01 |
| 10 | −1.0909351E+01 | −3.3970419E−01 | 2.9895759E−01 | −1.5487925E−01 |

| | A10 | A12 | A14 | A16 |
|---|---|---|---|---|
| 1 | 7.3615786E−01 | −1.2805754E+00 | 1.0422927E+00 | −4.0402215E−01 |
| 2 | −3.3618937E−01 | −3.1710410E−01 | 1.2488311E+00 | −7.8867528E−01 |
| 3 | −6.9518976E−01 | 8.8551140E−01 | 3.3513814E−01 | −5.9764108E−01 |
| 4 | 1.1989263E+01 | −2.7274104E+01 | 4.1138655E+01 | −2.6221811E+01 |
| 5 | 1.2799215E+00 | −6.0805643E−01 | −6.5701417E+00 | 1.0955959E+01 |
| 6 | 8.6734211E−01 | −1.2626762E+00 | 8.7271985E−01 | −1.2234385E−01 |
| 7 | −8.6810396E+00 | 1.3687948E+01 | −1.1500705E+01 | 3.7304276E+00 |
| 8 | 1.2739701E−02 | −7.4356044E−02 | 6.4549028E−02 | −1.2957543E−02 |
| 9 | 5.3475537E−02 | 1.5902396E−03 | −1.9540075E−03 | 1.7122320E−04 |
| 10 | 5.0278107E−02 | −9.7894164E−03 | 1.0056192E−03 | −4.1181094E−05 |

TABLE 13

VALUES IN CONDITIONAL EXPRESSIONS

| EXPRESSION NUMBER | CONDITIONAL EXPRESSIONS | EXAMPLE 1 | EXAMPLE 2 | EXAMPLE 3 | EXAMPLE 4 | EXAMPLE 5 | EXAMPLE 6 |
|---|---|---|---|---|---|---|---|
| (1) | f/f1 | 1.8 | 1.7 | 1.68 | 2.49 | 2.88 | 2.04 |
| (2) | f/f2 | −1.22 | −0.98 | −1.1 | −1.83 | −1.88 | −1.25 |
| (3) | f/f12 | 0.91 | 0.98 | 0.84 | 1.17 | 1.52 | 1.14 |
| (4) | f/f345 | −0.2 | −0.37 | −0.08 | −0.42 | −1.04 | −0.48 |
| (5) | f1/f3 | 0.15 | 0.05 | 0.2 | −0.03 | −0.3 | −0.16 |
| (6) | (R3f − R3r)/(R3f + R3r) | −0.18 | −0.03 | −0.48 | 0.73 | 0.98 | 0.95 |
| (7) | f/f5 | −0.55 | −1.1 | −1.88 | −1.51 | −2.43 | −0.83 |
| (8) | f·tanω/R5r | 1.7 | 0.86 | 1.5 | 1.66 | 1.44 | 1.64 |
| (9) | f/f3 | 0.27 | 0.09 | 0.34 | −0.06 | −0.86 | −0.33 |
| (10) | D7/f | 0.12 | 0.12 | 0.14 | 0.11 | 0.08 | 0.08 |

What is claimed is:

1. An imaging lens substantially consisting of, in order from an object side, five lenses of:
    a first lens that has a positive refractive power and has a meniscus shape which is convex toward the object side;
    a second lens that has a biconcave shape;
    a third lens that has a meniscus shape which is convex toward the object side;
    a fourth lens that has a meniscus shape which is convex toward an image side; and
    a fifth lens that has a negative refractive power and has at least one inflection point on an image side surface,
    wherein the following conditional expression (1) is satisfied:

$$1.4 < f/f1 < 4 \qquad (1),\text{ where}$$

f is a focal length of a whole system, and
f1 is a focal length of the first lens, and
wherein the following conditional expression (3) is further satisfied:

$$0.78 < f/f12 < 2.5 \qquad (3),\text{ where}$$

f12 is a composite focal length of the first lens and the second lens.

2. The imaging lens, as defined in claim 1, wherein the following conditional expression is further satisfied:

$$-3 < f/f2 < -0.85 \qquad (2),\text{ where}$$

f2 is a focal length of the second lens.

3. The imaging lens, as defined in claim 1, wherein the fourth lens has a positive refractive power.

4. The imaging lens, as defined in claim 1, wherein the following conditional expression is further satisfied:

$$-2 < f/f345 < 0 \qquad (4),\text{ where}$$

f345 is a composite focal length of the third to fifth lenses.

5. The imaging lens, as defined in claim 1, wherein the following conditional expression is further satisfied:

$$-0.5 < f1/f3 < 0.4 \qquad (5),\text{ where}$$

f3 is a focal length of the third lens.

6. The imaging lens, as defined in claim 1, wherein the following conditional expression is further satisfied:

$$-1 < (R3f - R3r)/(R3f + R3r) < 1.2 \qquad (6),\text{ where}$$

R3f is a paraxial radius of curvature of an object side surface of the third lens, and R3r is a paraxial radius of curvature of an image side surface of the third lens.

7. The imaging lens, as defined in claim 1, wherein the following conditional expression is further satisfied:

$$-4<f/f5<-0.2 \qquad (7), \text{where}$$

f5 is a focal length of the fifth lens.

8. The imaging lens, as defined in claim 1, wherein the following conditional expression is further satisfied:

$$0.5<f\cdot\tan\omega/R5r<10 \qquad (8), \text{where}$$

ω is a half angle of view, and
R5r is a paraxial radius of curvature of the image side surface of the fifth lens.

9. The imaging lens, as defined in claim 1, wherein the following conditional expression is further satisfied:

$$-0.9<f/f3<0.7 \qquad (9), \text{where}$$

f3 is a focal length of the third lens.

10. The imaging lens, as defined in claim 1, wherein the following conditional expression is further satisfied:

$$0.05<D7/f<0.2 \qquad (10), \text{where}$$

D7 is a spacing on an optical axis between the third lens and the fourth lens.

11. The imaging lens, as defined in claim 1, further comprising an aperture stop that is disposed on the object side of an object side surface of the second lens.

12. The imaging lens, as defined in claim 1, wherein the following conditional expression is further satisfied:

$$1.5<f/f1<3.5 \qquad (1\text{-}1).$$

13. The imaging lens, as defined in claim 1, wherein the following conditional expression is further satisfied:

$$-2.5<f/f2<-0.9 \qquad (2\text{-}1), \text{where}$$

f2 is a focal length of the second lens.

14. The imaging lens, as defined in claim 1, wherein the following conditional expression is further satisfied:

$$0.8<f/f12<2 \qquad (3\text{-}1), \text{where}$$

f12 is a composite focal length of the first lens and the second lens.

15. The imaging lens, as defined in claim 1, wherein the following conditional expression is further satisfied:

$$-1.5<f/f345<-0.05 \qquad (4\text{-}1), \text{where}$$

f345 is a composite focal length of the third to fifth lenses.

16. The imaging lens, as defined in claim 1, wherein the following conditional expression is further satisfied:

$$-0.4<f1/f3<0.2 \qquad (5\text{-}1), \text{where}$$

f3 is a focal length of the third lens.

17. The imaging lens, as defined in claim 1, wherein the following conditional expression is further satisfied:

$$-0.6<(R3f-R3r)/(R3f+R3r)<1 \qquad (6\text{-}1), \text{where}$$

R3f is a paraxial radius of curvature of the object side surface of the third lens, and
R3r is a paraxial radius of curvature of the image side surface of the third lens.

18. The imaging lens, as defined in claim 1, wherein when a composite refractive power of the first to third lenses is positive, the following conditional expression is further satisfied:

$$-3<f/f5<-0.4 \qquad (7\text{-}1), \text{where}$$

f5 is a focal length of the fifth lens.

19. An imaging apparatus comprising:
the imaging lens, as defined in claim 1.

20. An imaging lens substantially consisting of, in order from an object side, five lenses of:
a first lens that has a positive refractive power and has a meniscus shape which is convex toward the object side;
a second lens that has a biconcave shape;
a third lens that has a meniscus shape which is convex toward the object side;
a fourth lens that has a meniscus shape which is convex toward an image side; and
a fifth lens that has a negative refractive power and has at least one inflection point on an image side surface,
wherein the following conditional expression (1) is satisfied:

$$1.4<f/f1<4 \qquad (1), \text{where}$$

f is a focal length of a whole system, and
f1 is a focal length of the first lens, and
wherein the following conditional expression (4) is further satisfied:

$$-2<f/f345<0 \qquad (4), \text{where}$$

f345 is a composite focal length of the third to fifth lenses.

21. An imaging lens substantially consisting of, in order from an object side, five lenses of:
a first lens that has a positive refractive power and has a meniscus shape which is convex toward the object side;
a second lens that has a biconcave shape;
a third lens that has a meniscus shape which is convex toward the object side;
a fourth lens that has a meniscus shape which is convex toward an image side; and
a fifth lens that has a negative refractive power and has at least one inflection point on an image side surface,
wherein the following conditional expression (1) is satisfied:

$$1.4<f/f1<4 \qquad (1), \text{where}$$

f is a focal length of a whole system, and
f1 is a focal length of the first lens, and
wherein the following conditional expression (5-1) is further satisfied:

$$-0.4<f1/f3<0.2 \qquad (5\text{-}1), \text{where}$$

f3 is a focal length of the third lens.

* * * * *